United States Patent
Suryavanshi et al.

(10) Patent No.: US 9,455,910 B2
(45) Date of Patent: Sep. 27, 2016

(54) EXCHANGING INTERNET PROTOCOL VERSION CAPABILITY INFORMATION BETWEEN CLIENT DEVICES OVER A COMMUNICATIONS NETWORK

(71) Applicant: QUALCOMM Incorporated, San Diego, CA (US)

(72) Inventors: Vijay Anandrao Suryavanshi, San Diego, CA (US); Mark Maggenti, Del Mark, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/147,229

(22) Filed: Jan. 3, 2014

(65) Prior Publication Data

US 2015/0195199 A1  Jul. 9, 2015

(51) Int. Cl.
| | |
|---|---|
| *H04L 29/12* | (2006.01) |
| *H04L 12/56* | (2006.01) |
| *H04L 29/06* | (2006.01) |
| *H04W 80/04* | (2009.01) |

(52) U.S. Cl.
CPC ......... *H04L 45/741* (2013.01); *H04L 61/6086* (2013.01); *H04L 65/1006* (2013.01); *H04L 65/1016* (2013.01); *H04L 69/167* (2013.01); *H04L 69/18* (2013.01); *H04W 80/045* (2013.01)

(58) Field of Classification Search
CPC .......................... H04M 1/2535; H04L 69/167
USPC .............................. 340/9.13, 286.02; 370/392
See application file for complete search history.

(56) References Cited

U.S. PATENT DOCUMENTS

| | | | |
|---|---|---|---|
| 7,701,958 B2 | 4/2010 | Abrol et al. | |
| 8,331,355 B2 * | 12/2012 | Buckley | H04L 29/12349 370/352 |
| 2005/0066038 A1 | 3/2005 | Sakamoto et al. | |

(Continued)

OTHER PUBLICATIONS

Chen W E., et al.,"Client-based Internet Protocol version 4-Internet Protocol version 6 translation mechanism for Session Initiation Protocol multimedia services in next generation networks", IET Networks, The Institution of Engineering and Technology, Michael Faraday House, Six Hills Way, Stevenage, Herts. SG1 2AY, UK, vol. 2, No. 3, Sep. 1, 2013, pp. 115-123, XP006045986, ISSN: 2047-4954, DOI: 10.1 049/IET-NET.2012.0084.

(Continued)

*Primary Examiner* — Luat Phung
*Assistant Examiner* — Thomas R Cairns
(74) *Attorney, Agent, or Firm* — Muncy, Geissler, Olds & Lowe, P.C.

(57) ABSTRACT

In an embodiment, a dual stack (DS) client device (IPv4+ IPv6) configures a header of a message for transmission to include a Via header with an IPv4 address of the DS client device, and transmits the configured message to a server via an IPv6 socket for transmission to a target client device. The target client device receives a message from a server in response to the configured message that identifies the DS capability of the dual stack client device based on a Via header that includes both IPv4 and IPv6 addresses. In another embodiment, a DS client device receives a message with a Via header configuration indicating IPv4 and/or IPv6 addresses through which another client device can communicate, identifies the other client device as DS, IPv4-only or IPv6-only based on the Via header configuration and selects a target format for communication with the other client device based on the identification.

30 Claims, 20 Drawing Sheets

(56) References Cited

U.S. PATENT DOCUMENTS

| | | | |
|---|---|---|---|
| 2005/0185672 A1* | 8/2005 | Endo | H04L 29/06027 370/466 |
| 2009/0319691 A1 | 12/2009 | Buckley et al. | |
| 2011/0106947 A1 | 5/2011 | Lin | |
| 2012/0082158 A1 | 4/2012 | Reddy et al. | |
| 2013/0103853 A1* | 4/2013 | Lyon | H04L 61/6086 709/238 |
| 2013/0148650 A1 | 6/2013 | Chen et al. | |
| 2014/0006632 A1* | 1/2014 | Evens | H04L 65/605 709/227 |

OTHER PUBLICATIONS

International Search Report and Written Opinion—PCT/US2015/010055—ISA/EPO—Apr. 9, 2015.

* cited by examiner

EXCHANGING INTERNET PROTOCOL VERSION CAPABILITY INFORMATION BETWEEN CLIENT DEVICES OVER A COMMUNICATIONS NETWORK

BACKGROUND OF THE INVENTION

1. Field of the Invention

Embodiments of the invention relate to exchanging Internet Protocol (IP) version capability information between client devices over a communications network.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Access networks using various communication protocols (e.g., 3GPP access networks such as W-CDMA, LTE, etc., or non-3GPP access networks such as WiFi, WLAN or wired LAN, etc.) can be configured to provide Internet Protocol (IP) Multimedia Subsystem (IMS) services via an IMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

SUMMARY

In an embodiment, a dual stack (DS) client device (IPv4+IPv6) configures a header of a message for transmission to include a Via header with an IPv4 address of the DS client device, and transmits the configured message to a server via an IPv6 socket for transmission to a target client device. The target client device receives a message from a server in response to the configured message that identifies the DS capability of the dual stack client device based on a Via header that includes both IPv4 and IPv6 addresses. In another embodiment, a DS client device receives a message with a Via header configuration indicating IPv4 and/or IPv6 addresses through which another client device can communicate, identifies the other client device as DS, IPv4-only or IPv6-only based on the Via header configuration and selects a target format for communication with the other client device based on the identification.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
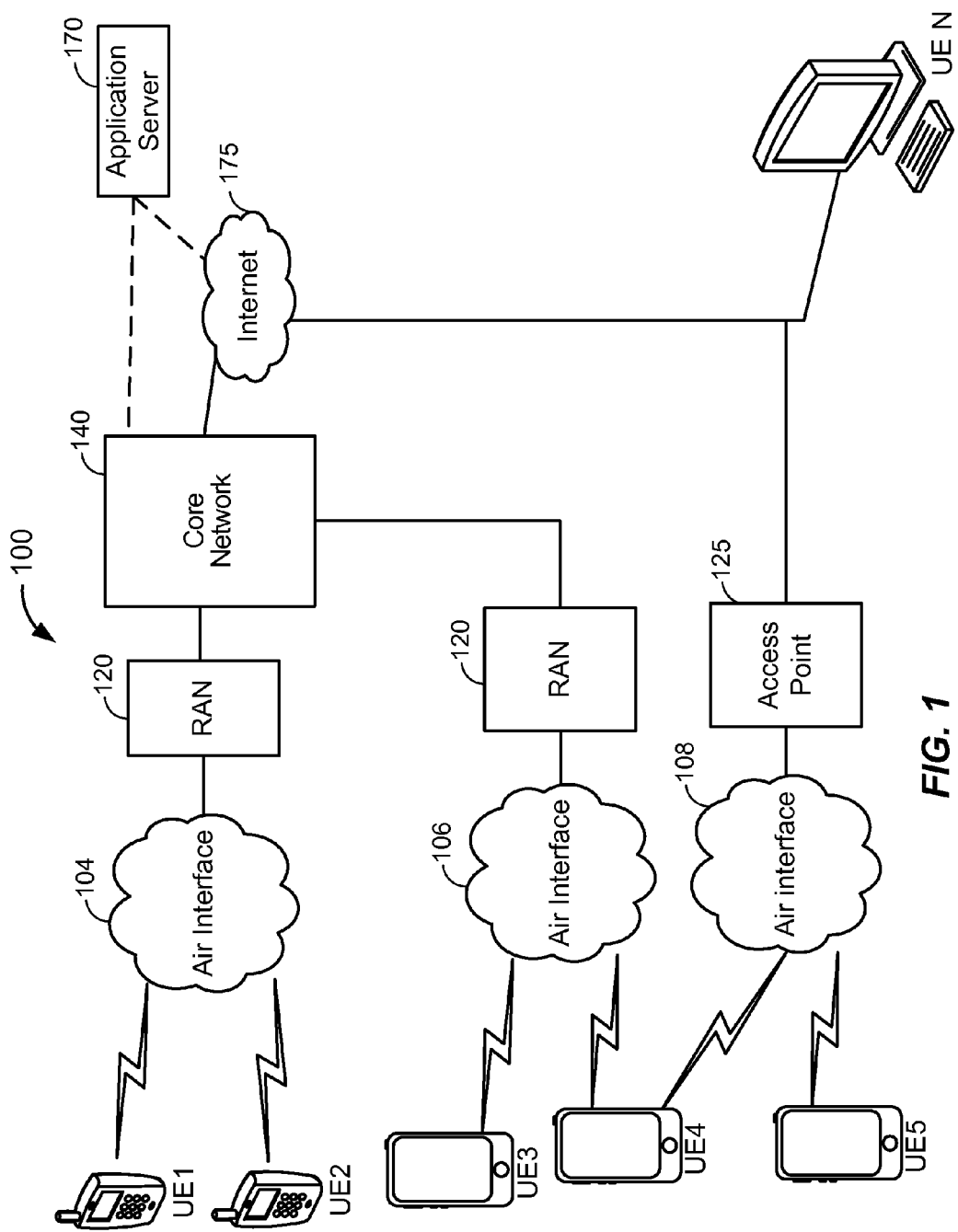
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
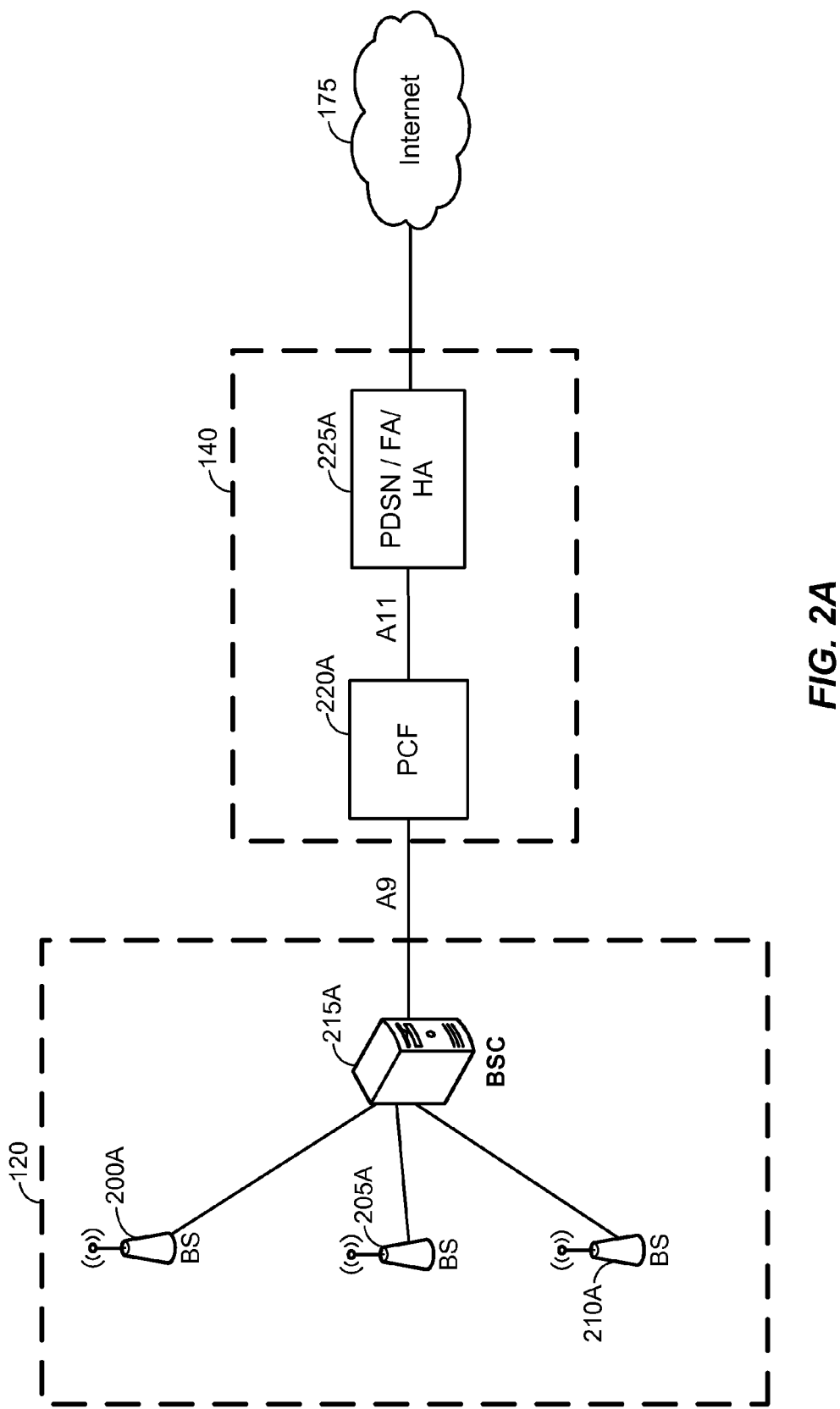
FIG. 2A illustrates an example configuration of a radio access network (RAN) and a packet-switched portion of a core network for a 1x EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
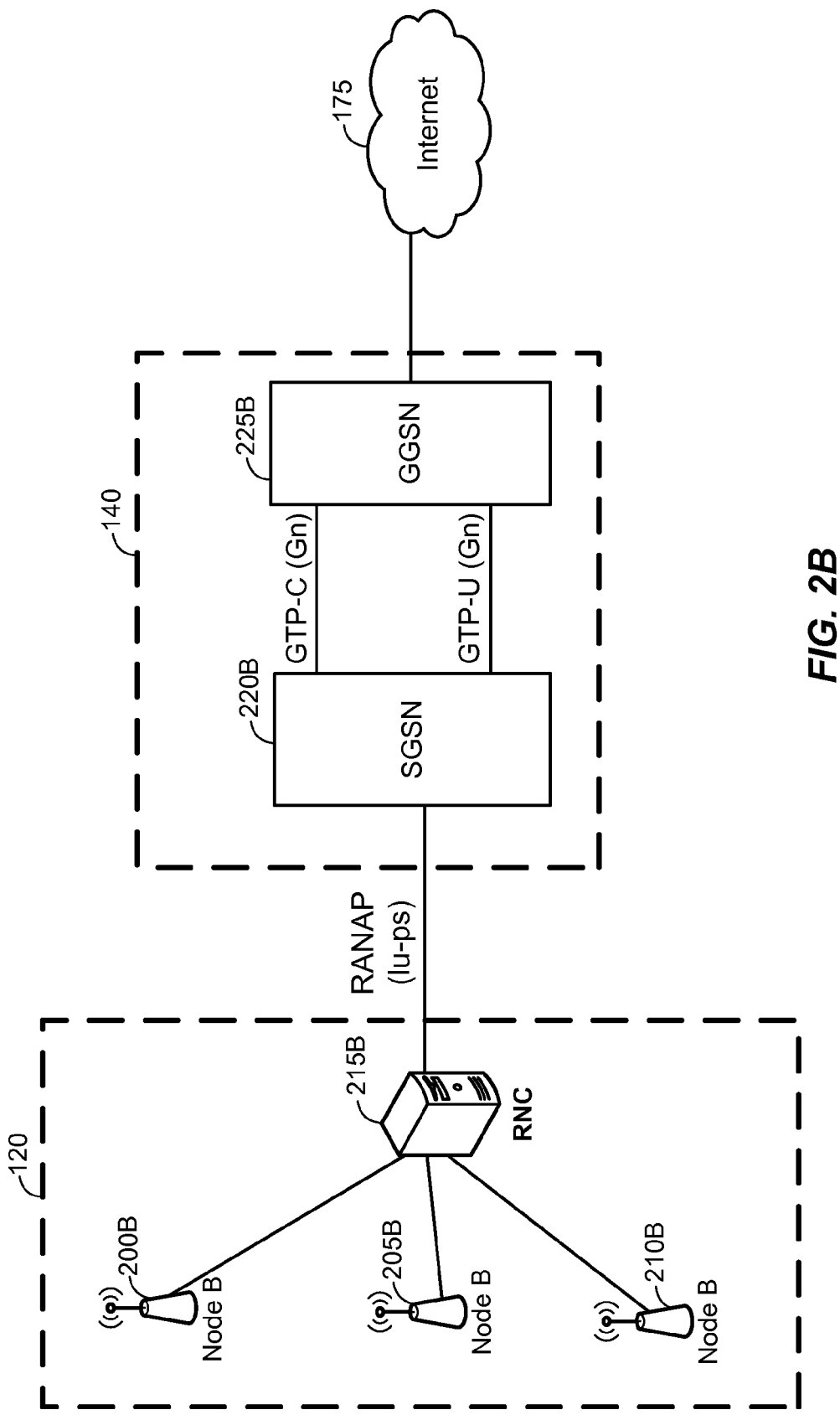
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks.

The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
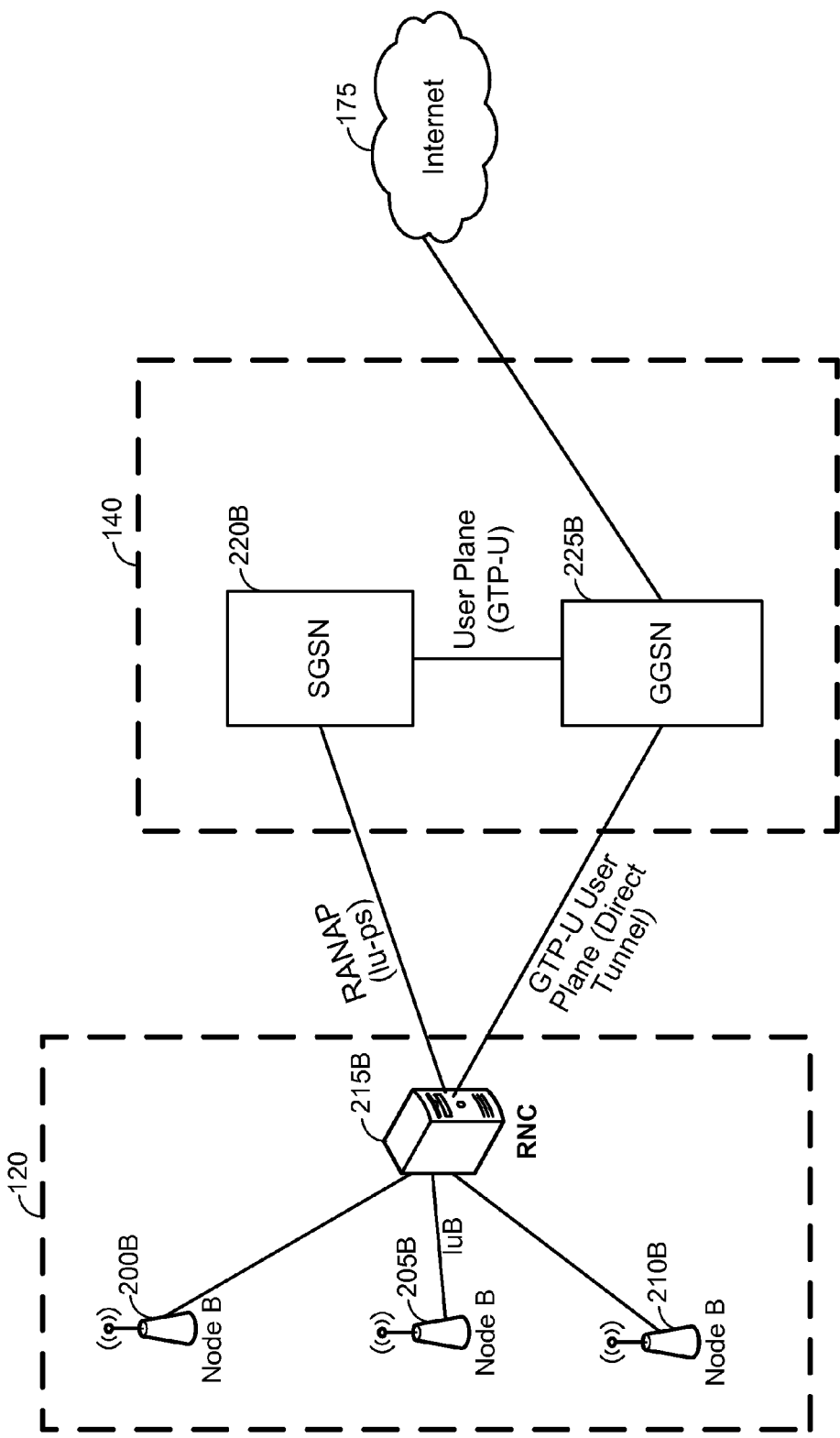
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
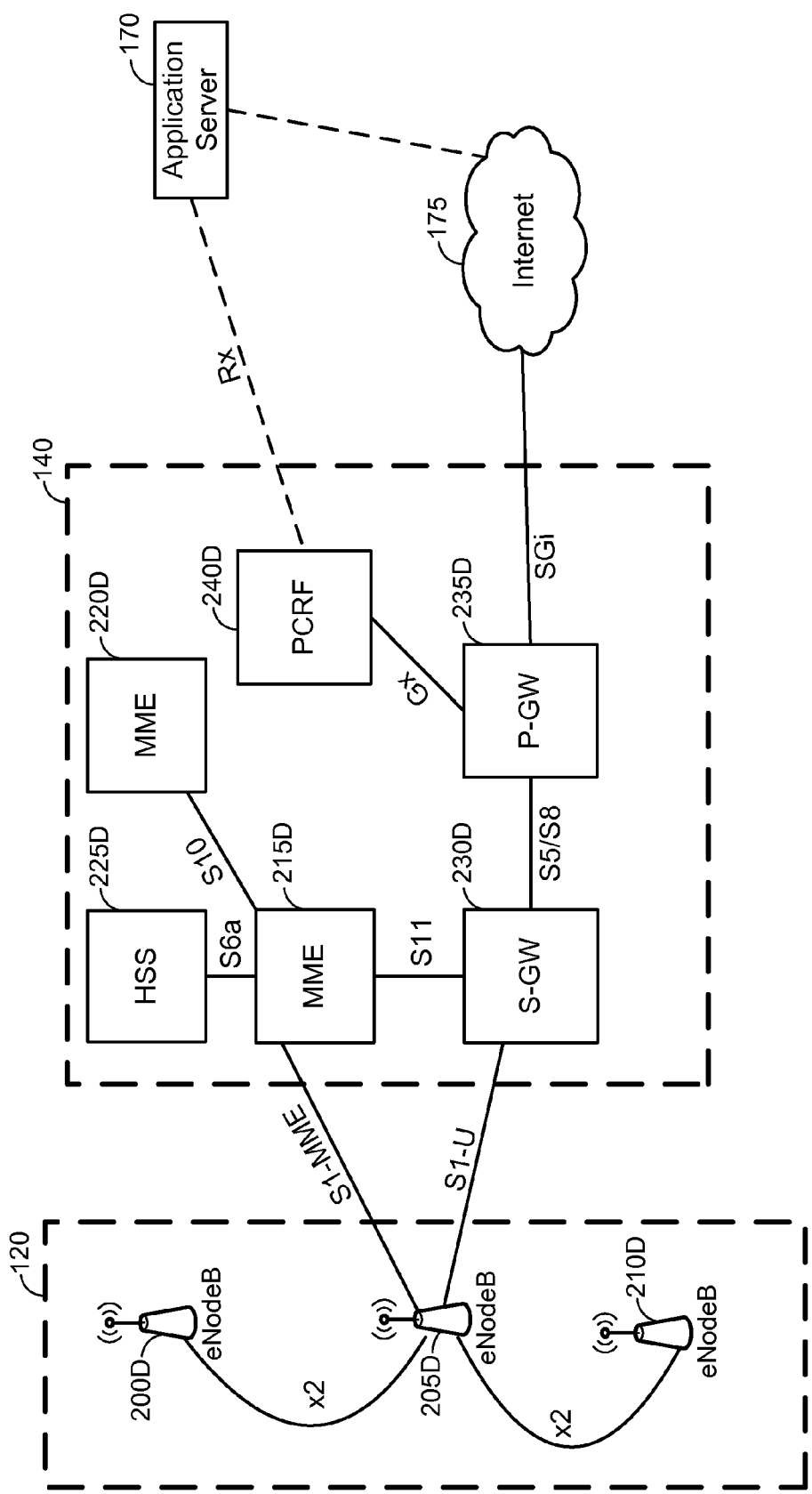
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMES) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
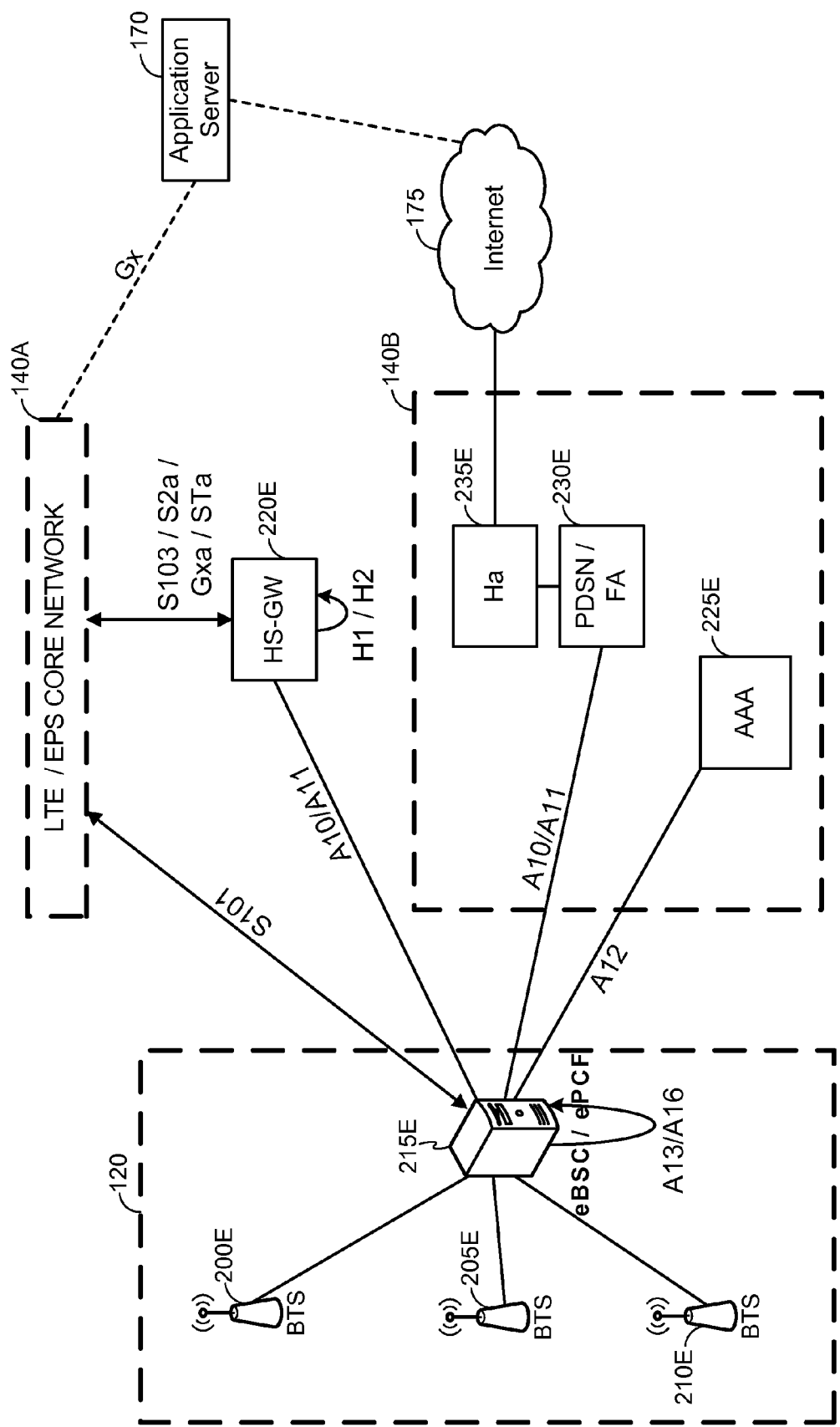
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
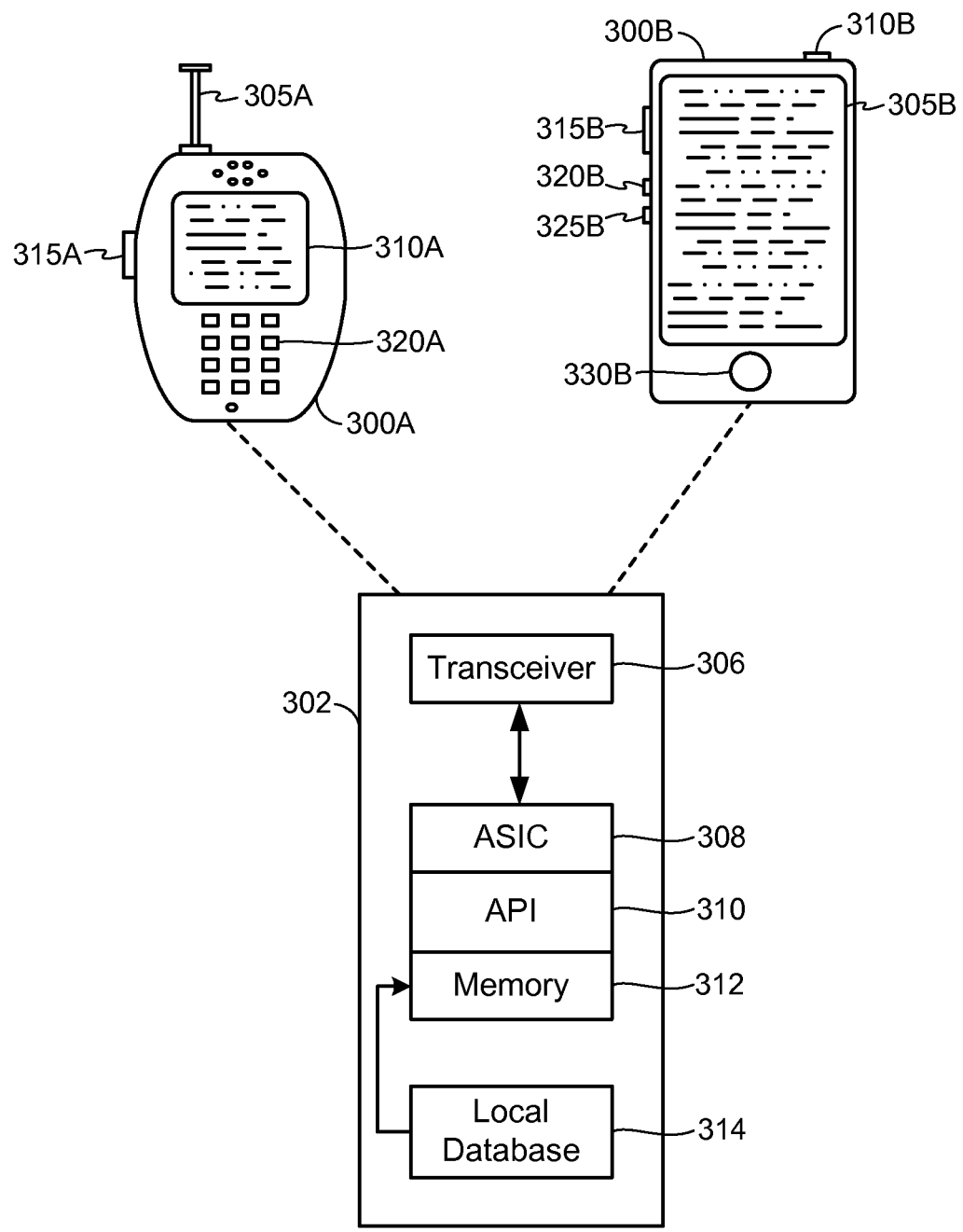
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
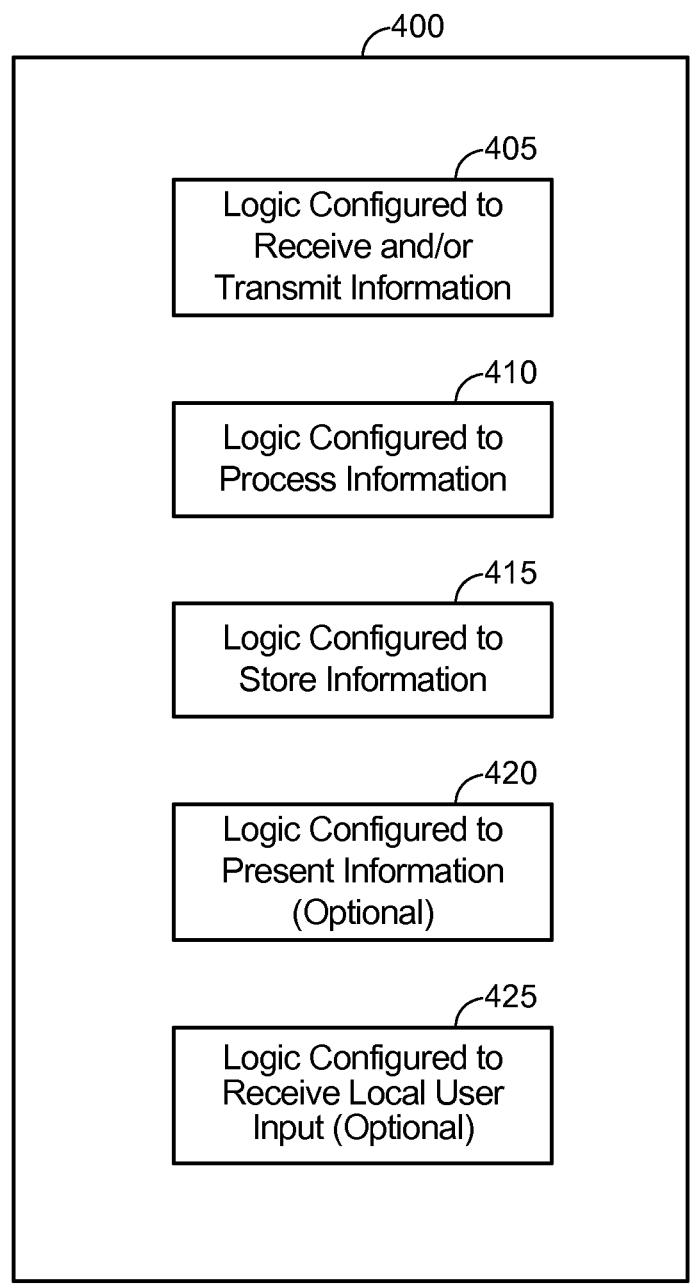
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
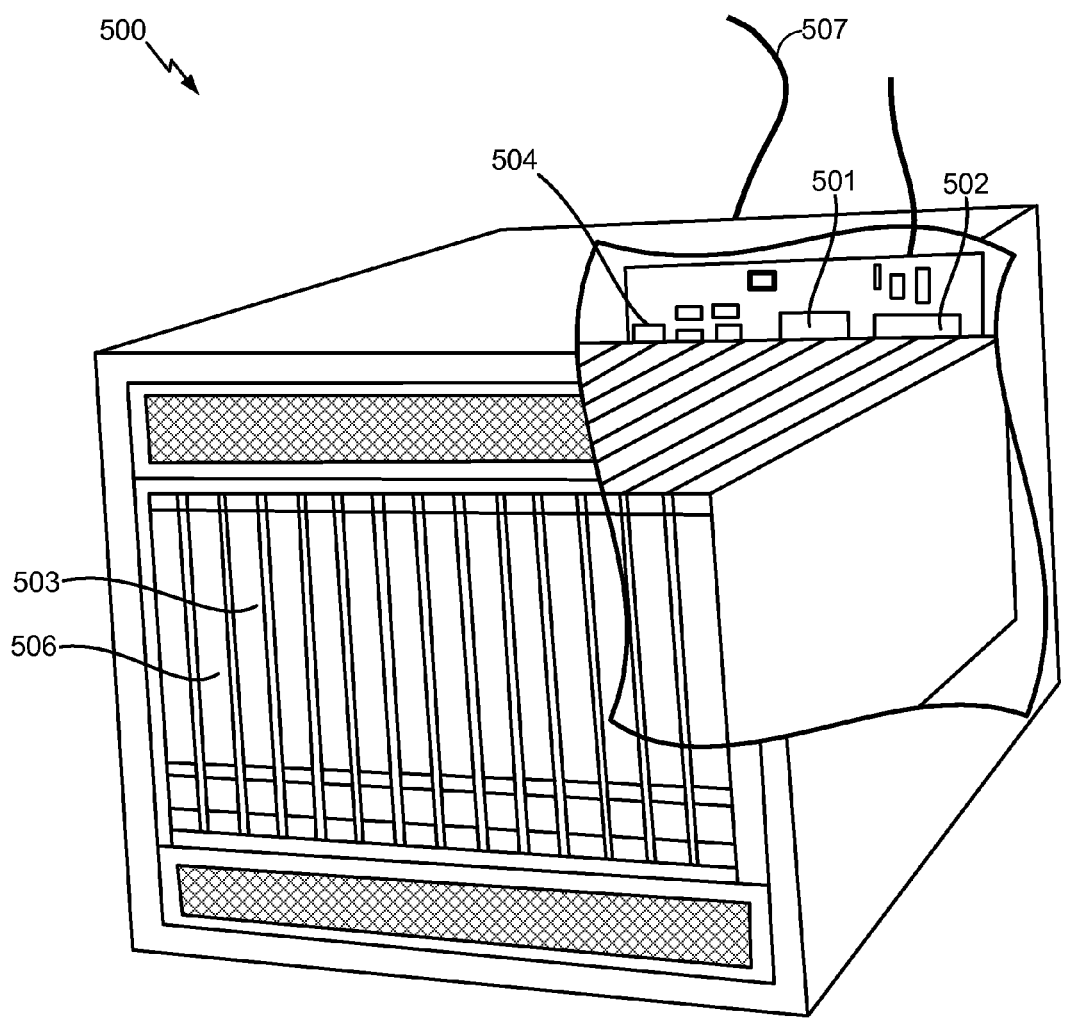
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Access networks using various communication protocols (e.g., 3GPP access networks such as W-CDMA, LTE, etc. as described above with respect to FIGS. 2A-2E, or non-3GPP access networks such as WiFi, WLAN or wired LAN, IEEE 802, IEEE 802.11, etc.) can be configured to provide Internet Protocol (IP) Multimedia Subsystem (IMS) services via an IMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

Figure 6:
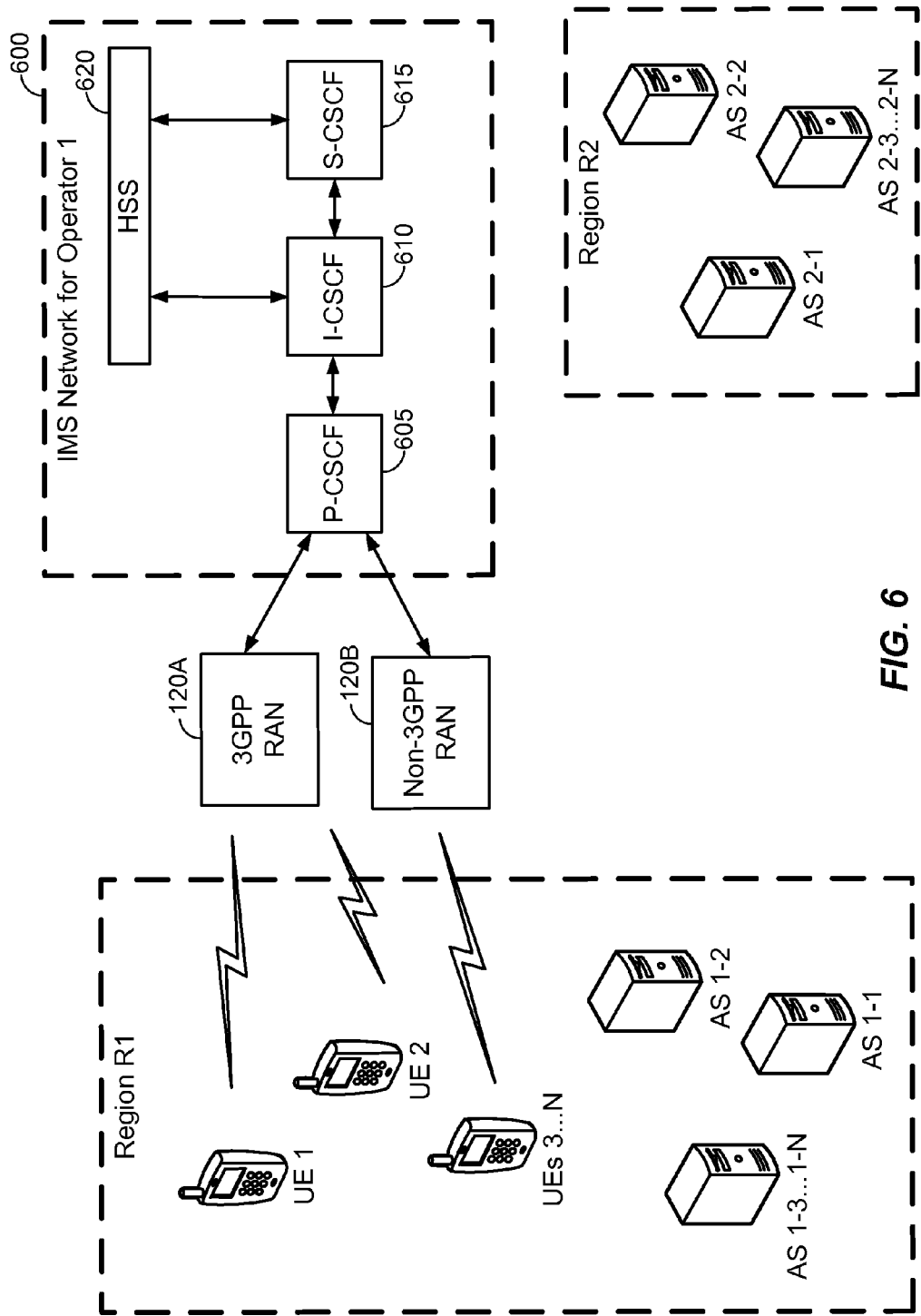
FIG. 6 illustrates an example of Internet Protocol (IP) multimedia subsystem (IMS) session architecture in accordance with an embodiment of the invention.

FIG. 6 illustrates an example of IMS architecture in accordance with an embodiment of the invention. Referring to FIG. 6, assume that a first cluster of application servers denoted as AS 1-1, AS 1-2 . . . AS 1-N is configured to provide IMS service to UEs and is located (or deployed) in a first region, and that a second cluster of application servers denoted as AS 2-1, AS 2-2 . . . AS 2-N is configured to provide IMS service to UEs is located (or deployed) in a second region. While not shown in FIG. 6 explicitly, other clusters of application servers can be deployed in other cluster regions as well. In FIG. 6, each cluster of application servers is assumed to be operated by the same operator (e.g., Sprint, Verizon, AT&T, etc.). In FIG. 6, UEs 1 . . . N are assumed to be operating in cluster region R1 and are configured to connect either to a 3GPP RAN 120A (e.g., any of RANs 120 from FIGS. 2A-2E) or a non-3GPP RAN 120B (e.g., a wired Ethernet connection, a WiFi connection such as AP 125, etc.). UEs 1 . . . N can then connect to an IMS network 600 through either the 3GPP RAN 120A or the non-3GPP RAN 120B.

Referring to FIG. 6, the IMS network 600 is shown as illustrating a particular set of IMS components, including a proxy call session control function (P-CSCF) 605, an interrogating CSCF (I-CSCF) 610, a serving CSCF (S-CSCF) 615 and a Home Subscriber Server (HSS) 620. The P-CSCF 605, I-CSCF 610 and S-CSCF 615 are sometimes referred to collectively as the CSCF, and the CSCF is responsible for signaling via Session Initiation Protocol (SIP) between the Transport Plane, Control Plane, and the Application Plane of the IMS network 600.

Referring to the P-CSCF 605 of FIG. 6, the P-CSCF 605 is responsible for interfacing directly with Transport Plane components and is the first point of signaling within the IMS network 600 for any end-point, such as UEs 1 . . . N. Once an endpoint acquires IP connectivity, the end point will cause a registration event to occur by first signaling to the P-CSCF 605. As the name implies, the P-CSCF 605 is a proxy for SIP messages from end-points to the rest of the IMS network 600. It is usually in a home network of the end point, but may reside in a visited network of the end point. The P-CSCF 605 will use a DNS look-up to identify a target I-CSCF 610 to send SIP messages, which could be an I-CSCF 610 in its own network or another I-CSCF across an administrative domain. The P-CSCF 605 can also be responsible for policy decisions (e.g., via an integrated or stand-alone Policy Decision Function (PDF) in Releases 5 or 6 of IMS, via a Policy Charging, and Resource Function (PCRF) in Release 7 of IMS, etc.).

Referring to the I-CSCF 610 of FIG. 6, the main function of the I-CSCF 610 is to proxy between the P-CSCF 605 as entry point and S-CSCF 615 as control point for applications found in the Applications Plane. When the P-CSCF 605 receives a registration request SIP message, it will perform a DNS look-up to discover the appropriate I-CSCF 610 to route the message. Once the I-CSCF 610 receives the SIP message, it will perform a look-up operation with the HSS 620 via Diameter to determine the S-CSCF 615 that is associated with the end-point terminal. Once it receives this information, it will forward the SIP message to the appropriate S-CSCF 610 for further treatment.

Referring to the S-CSCF 615, the S-CSCF 615 is responsible for interfacing with the Application Servers (AS) (e.g., such as application servers 1-1, 1-2 . . . 1-N in cluster region R1, or application servers 2-1, 2-2 . . . 2-N in cluster region 2, and so on) in the Application Plane. Upon receiving a registration request SIP message from an I-CSCF 610, the S-CSCF 615 will query the HSS 622 via Diameter protocol to register the terminal as being currently served by itself. Subsequent session establishment requires knowing which S-CSCF 615 is responsible for the terminal session control. As part of the registration process, the S-CSCF 615 uses credentials it obtains from the query to the HSS 620 to issue an SIP message "challenge" back to the initiating P-CSCF 605 to authenticate the terminal.

In addition to acting as a registrar, the S-CSCF 615 is also responsible for routing SIP messages to the AS allowing for the Control Plane session control to interact with the Application Plane application logic. To do this, the S-CSCF 615 uses information obtained from the HSS 620 in the form of Initial Filter Criteria (IFC) that acts as triggers against inbound session establishment requests. The IFC includes rules that define how and where SIP messages should be routed to the various application servers that may reside in the Application Plane. The S-CSCF 615 may also act on Secondary Filter Criteria (SFC) obtained from the application servers during the course of messaging with them.

Referring to FIG. 6, a UE that requests IMS service (e.g., registration to set-up or join a VoIP session, a PTT session, a group communication session, etc.) from the IMS network 600 is assigned (or registered) to a target application server that is selected by the S-CSCF 615, as noted above. Generally, the IMS network 600 will attempt to select, as the target application server, an application server that is physically close to the UE and is also known to be capable of providing the requested IMS service.

In modern IP-based communications, endpoints (e.g., user agent clients (UACs), UEs, client devices, etc.) can be addressed using an IPv4 address, an IPv6 address or both IPv4 and IPv6 addresses. Some client devices are only capable of communicating using IPv4 ("IPv4 client devices"), while other client devices are only capable of communicating using IPv6 ("IPv6 client devices"). Still other client devices can communicate using both IPv4 and IPv6, and these client devices are referred to as "dual stack" client devices.

In conventional SIP, a dual stack UAC (or originating SIP client device) can select either the IPv4 address or the IPv6 address when initiating a SIP request to a user agent server (UAS) (not shown). The UAS is responsible for forwarding the SIP request to the next hop which could be another UAS or the target client device(s) for the communication. If the target client device(s) are not dual stack client devices (e.g., the target client devices have an IPv4 address or an IPv6 address, but not both), the IP header of the SIP request may require translation by a network address and port translation (NAPT) gateway so that the SIP request message can be processed by the target client device(s). Conventionally, the originating SIP client device does not have any special knowledge regarding the IPv4/IPv6 capabilities of the target client device(s), which is why the NAPT gateway is used for IPv4/IPv6 translation.

Figure 7:
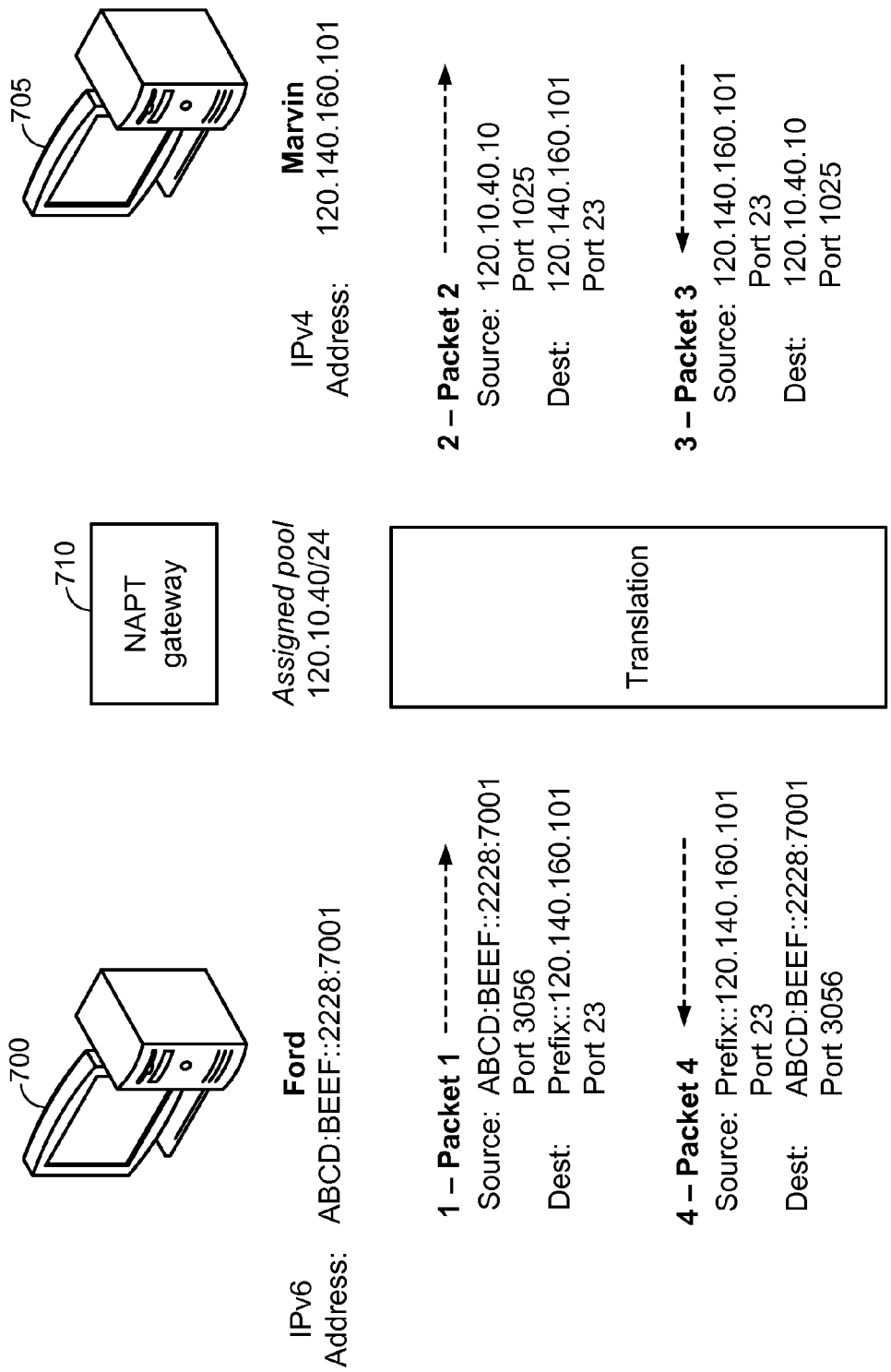
FIG. 7 illustrates a conventional manner by which an IPv6 client device communicates with an IPv4 client device.

This aspect is shown in FIG. 7, whereby an IPv6 client device 700 operated by a first user ("Ford") is communicating with an IPv4 client device 705 operated by a second user ("Marvin"). The IPv6 client device 700 is assigned an IPv6 address (i.e., ABCD:BEEF:2228:7001) on Port 3056 and the IPv4 client device 705 is assigned an IPv4 address (i.e., 120.140.160.101) on Port 23. Signaling between the IPv4 and IPv6 client devices 700 and 705 is mediated through a NAPT gateway 700, which is assigned an IPv4 address of 120.10.40/24 on Port 1025. Generally, the terminology of "IP address" is used to refer to either the IP address itself or a combination of the IP address and its associated port number.

Referring to FIG. 7, at (1), the IPv6 client device 700 sends a IPv6 packet to the NAPT gateway 710 via IPv6 (i.e., over an IPv6 socket) with a header having a source field set to the IPv6 address and Port number of the IPv6 client device 700, and a destination field with a prefix set to the IPv4 address and Port number of the IPv4 client device 705. The NAPT gateway 710 receives the IPv6 packet and translates the IPv6 packet into an IPv4 packet with a header having a source field set to the IPv4 address and Port number of the NAPT gateway 710, and a destination field set to the IPv4 address and Port number of the IPv4 client device 705. The translated IPv4 packet is delivered by the NAPT gateway 710 to the IPv4 client device 705 in (2) of FIG. 7.

Next, still referring to FIG. 7, at (3), the IPv4 client device 705 sends a IPv4 packet to the NAPT gateway 710 via IPv4 (i.e., over an IPv4 socket) with a header having a source field set to the IPv4 address and Port number of the IPv4 client device 705, and a destination field set to the IPv4 address and Port number of the NAPT gateway 710. The NAPT gateway 710 receives the IPv4 packet and translates the IPv4 packet into an IPv6 packet with a header having a source field with a prefix set to the IPv4 address and Port number of the IPv4 client device 705, and a destination field set to the IPv6 address and Port number of the IPv6 client device 700. The translated IPv6 packet is delivered by the NAPT gateway 710 to the IPv6 client device 700 in (4) of FIG. 7.

As will be appreciated from a review of FIG. 7, the IPv4 and IPv6 client devices 700 and 705 can still communicate with each other despite the differences in their IP version capability, but their communication is reliant upon the NAPT gateway 710 to perform the above-described translation function. Also, dual stack client devices are required to connect to the P-CSCF 605 via IPv6 under the current IMS standard.

Figure 8:
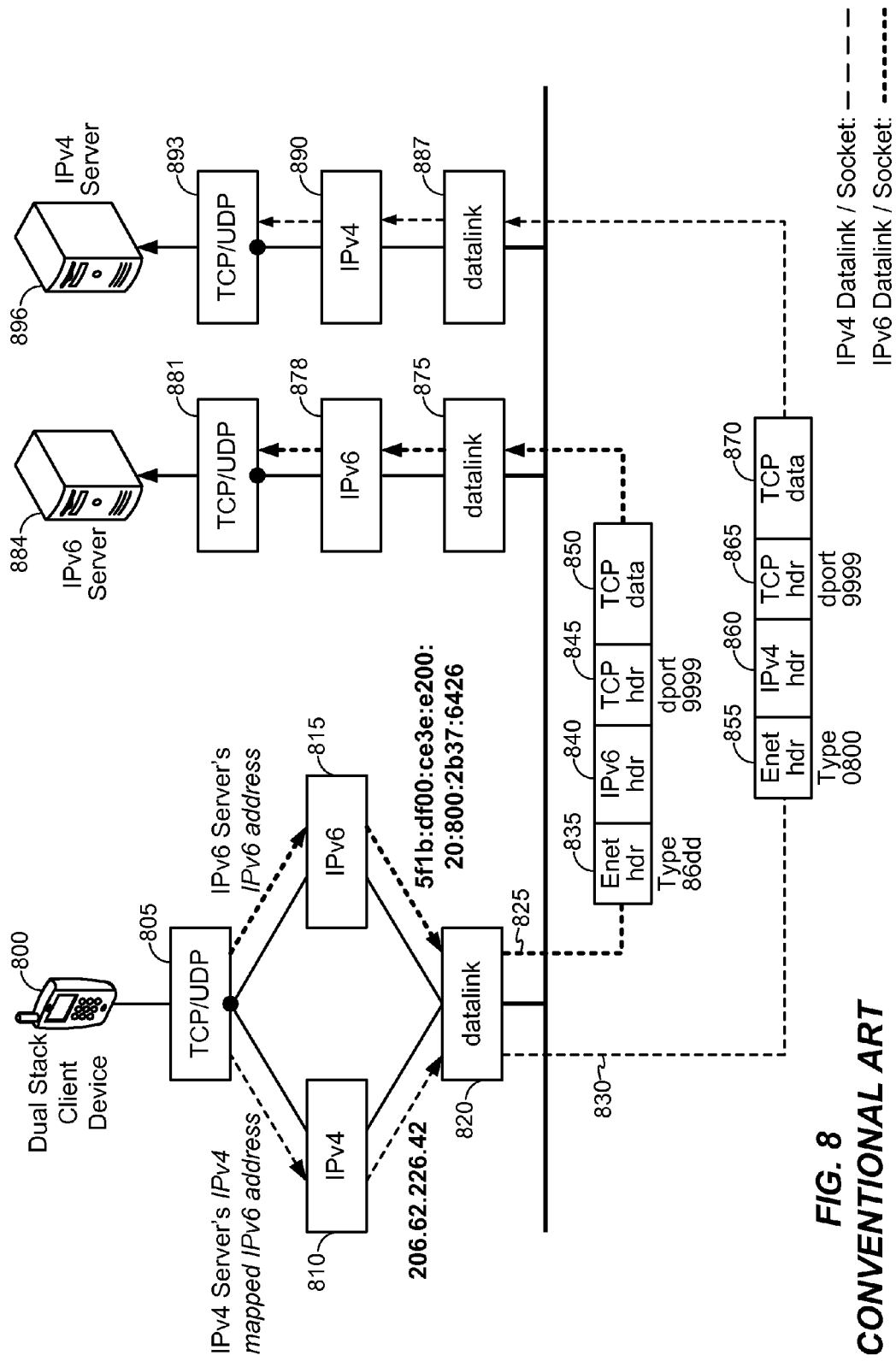
FIG. 8 illustrates conventional communication paths for IPv4 and IPv6 communications.

FIG. 8 illustrates conventional communication paths for IPv4 and IPv6 communications. As shown in FIG. 8, a dual stack client device 800 can address IPv4 packets to an IPv4-mapped version of an IPv6 address assigned to an IPv4 server 884, and the dual stack client device 800 can also address IPv6 packets to an IPv6 address assigned to an IPv6 server 896. In particular, data can be passed to a TCP/UDP 805, and the respective IPv4 and IPv6 packets can be configured at 810 and 815 and then passed to a datalink 820. The datalink 820 connects to a datalink 875 for the IPv6 server 884 via an IPv6 datalink 825 (or IPv6 socket), and the datalink 820 connects to the IPv4 server 896 via an IPv4 datalink 830 (or IPv4 socket). IPv6 packets carried on the IPv6 datalink 825 include fields such as an Enet header 835 (type 86dd), an IPv6 header 840, a TCP header 845 and TCP data 850. IPv4 packets carried on the IPv4 datalink 830 include fields such as an Enet header 855 (type 0800), an IPv4 header 860, a TCP header 865 and TCP data 870. The IPv6 packets arrived at the datalink 875, and are then processed using IPv6 and TCP/UDP protocols (878 and 881) before their payload data is delivered to an application at the IPv6 server 884. The IPv6 packets arrived at the datalink 887, and are then processed using IPv4 and TCP/UDP protocols (890 and 893) before their payload data is delivered to an application at the IPv4 server 896.

Figure 9:
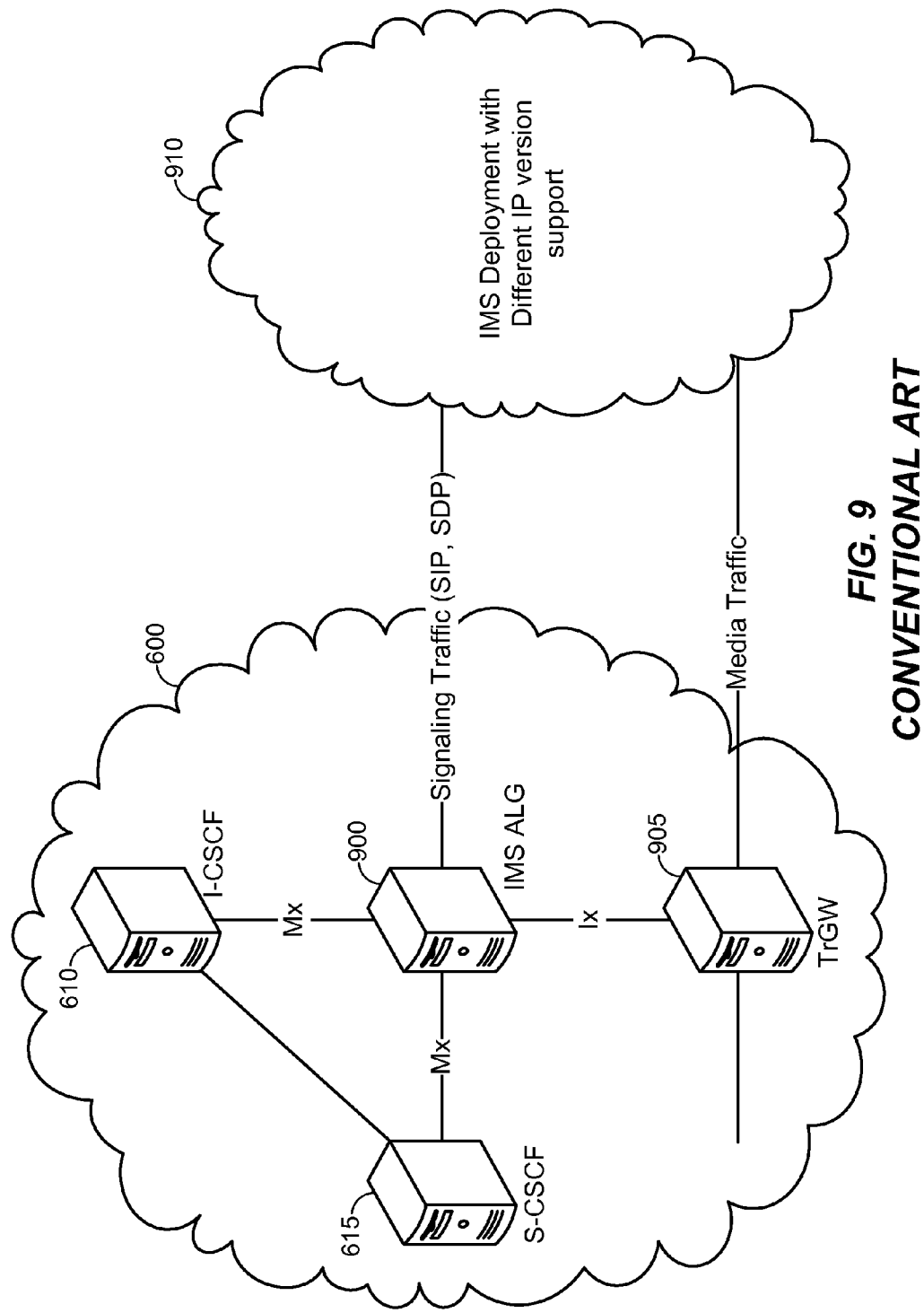
FIG. 9 illustrates a portion of the IMS network that is conventionally configured to perform IPv4/IPv6 translation.

FIG. 9 illustrates a portion of the IMS network 600 that is conventionally configured to perform IPv4/IPv6 translation. In FIG. 6, The I-CSCF 610 and S-CSCF 615 from FIG. 6 are shown as connected to an IMS Access Gateway (ALG) 900 via Mx interfaces. The IMS ALG 900 provides IPv4/IPv6 translation for signaling traffic exchanged with IMS devices 910 different IP version support by translating IP headers in the respective IP packets and/or overwriting IP address information in SDB attributes. Further, the IMS ALG 900 is shown as connected to a Transition Gateway (TrGW) 905 via an Ix interface. The TrGW 905 provides IPv4/IPv6 translation for media and control packets exchanged with IMS devices 910 different IP version support. Collectively, the IMS ALG 9800 and TrGW 905 in the IMS network 600 perform a similar translation function as described above with respect to the NAPT gateway 705 in an IMS environment.

Figure 10:
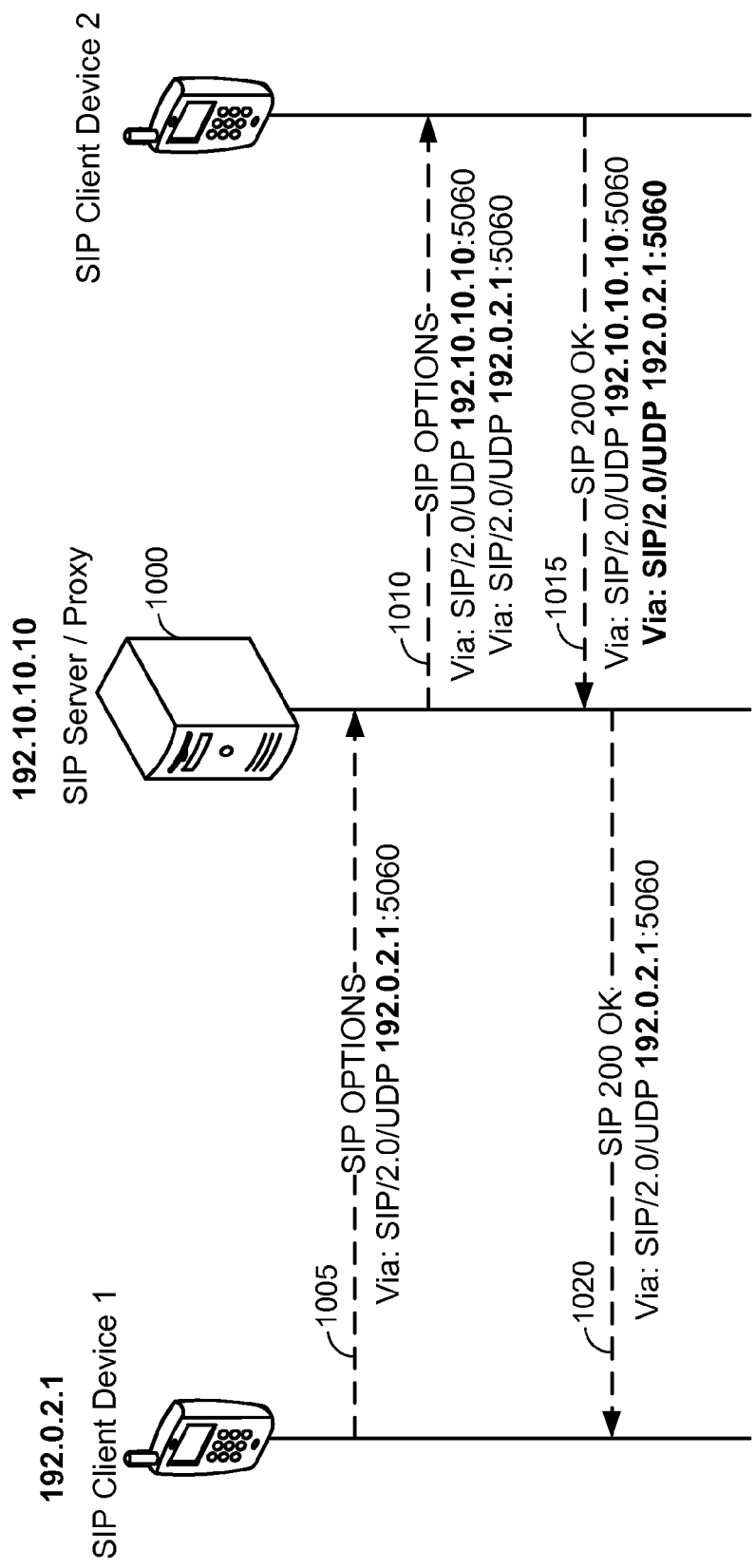
FIG. 10 illustrates a conventional Session Initiation Protocol (SIP) messaging procedure that shows Via headers within SIP packets.

FIG. 10 illustrates a conventional SIP messaging procedure that shows Via headers within SIP packets. Via headers are part of both IPv4 packets and IPv6 packets, and Via headers convey address information for one or more nodes through which an IPv4 packet or an IPv6 packet was transferred on its journey from source to destination. Referring to FIG. 10, SIP client device 1 transmits a SIP OPTIONS message to a SIP application server 1000 (e.g., AS 1-1 from FIG. 6, AS 2-1 from FIG. 6, etc.), 1005. The SIP OPTIONS message of 1005 is configured with a Via header that is set to the IP address and port number for SIP client device 1. For example, if SIP client device 1 is assigned an IPv4 address of 192.0.2.1 and a port number of 5060, then a Via header contained in the SIP OPTIONS message of 1005 is "Via: SIP/2.0/UDP 192.0.2.1:5060".

Figure 11:
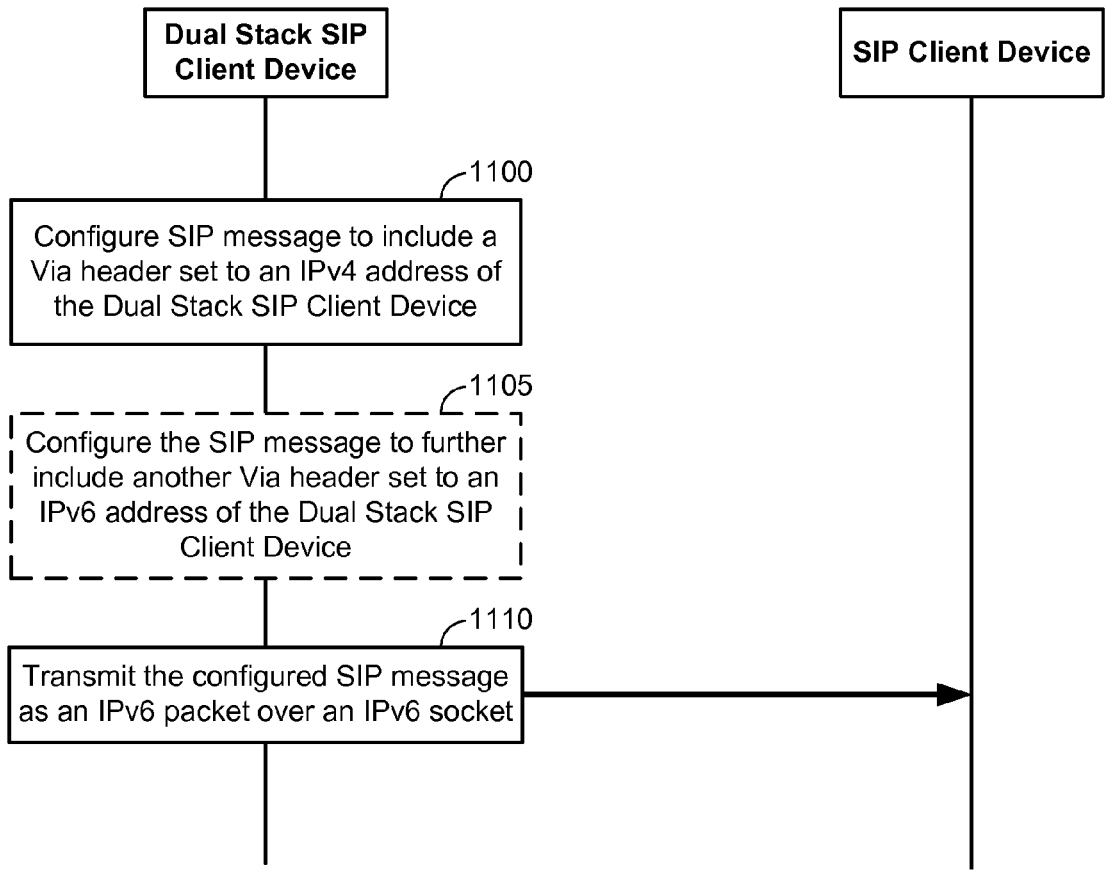
FIG. 11 illustrates a process by which a dual stack SIP client device configures a message to convey IP version capability information to a target SIP client device in accordance with an embodiment of the invention.

FIG. 11 illustrates a process by which a dual stack SIP client device configures a message to convey IP version capability information to a target SIP client device (e.g., an IPv4 SIP client device configured for IPv4-only, an IPv6 SIP client device configured for IPv6-only or another dual stack SIP client device configured for both IPv4 and IPv6) in accordance with an embodiment of the invention. Referring to FIG. 11, the dual stack SIP client device configures a SIP message (e.g., a SIP OPTIONS message) to include a Via header set to an IPv4 address that is assigned to the dual stack SIP client device, 1100. The dual stack SIP client device can also optionally configure the SIP message with an IPv6 address of the dual stack SIP client device, 1105, although this is not strictly necessary per the current SIP standard because a SIP server/proxy (not shown) would typically be able to derive the IPv6 address as being mapped to the IPv6 socket on which any IPv6 packets arrive from the dual stack SIP client device. The dual stack SIP client device then transmits the configured SIP message as an IPv6 packet over an IPv6 socket (or datalink), 1110, similar to 825-850 of FIG. 8 except that the configured SIP message of 1110 includes the IPv4 address in the Via header of the IPv6 packet instead of the IPv6 address (as in the conventional art).

Figure 12:
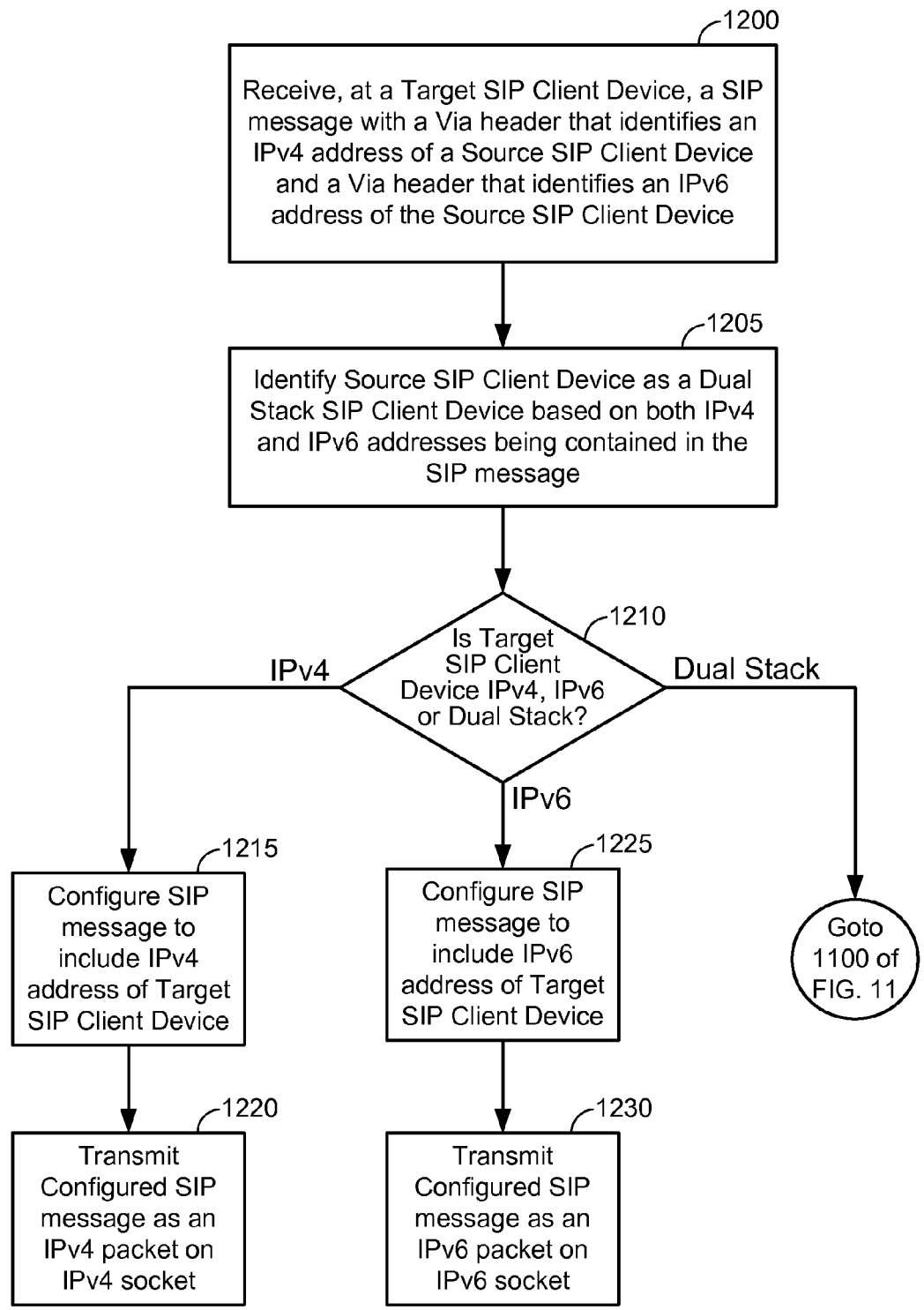
FIG. 12 illustrates operation of a target SIP client device in accordance with an embodiment of the invention.

FIG. 12 illustrates operation of a target SIP client device in accordance with an embodiment of the invention. Referring to FIG. 12, the target SIP client device receives a SIP message from a source SIP client device that includes a Via header identifying both an IPv4 address of the source SIP client device and also identifying an IPv6 address of the source SIP client device, 1200. In particular, the Via header can include identifications of both IPv4 and IPv6 addresses by listing the IPv4 address in a first portion of the Via header while listing the IPv6 address in a "received" parameter portion of the same Via header. Conventionally, the first portion of the Via header and the "received" parameter map to the same IP address (e.g., the IPv4 address for an IPv4 packet, or the IPv6 address for an IPv6 packet). Thus, configuring the Via header to include both IPv4 and IPv6 addresses diverges from the conventional operation and can be used to convey "dual stack" status of a source client device to one or more target client devices.

Further, it will be appreciated that the SIP message received at 1200 could also include other Via headers, such as Via headers that identify IPv4 or IPv6 addresses of a dual stack SIP server/proxy (not shown), Via headers that identify IPv4 or IPv6 addresses of a NAPT gateway or IMS ALG, and so on. In an example, the SIP message received at 1200 can correspond to a version of the configured SIP message transmitted at 1110 (e.g., a SIP OPTIONS message) that is modified at the dual stack SIP server/proxy to include the IPv6 address of the source SIP client device.

Referring to FIG. 12, the target SIP client device identifies that the source SIP client device is dual stack based on the SIP message being received with both IPv4 and IPv6 addresses for the source SIP client device in the above-noted Via header, 1205. At this point, the target SIP client device responds to the dual stack-identifying SIP message from 1200 in a selective manner based on whether the target SIP client device itself is IPv4-only, IPv6-only or dual stack, 1210.

In particular, if the target SIP client device determines itself to be IPv4-only in 1210, then the IPv4-only target SIP client device configures a Via header of a SIP message (e.g., a SIP OPTIONS message) to include the IPv4 address of the IPv4-only target SIP client device (i.e., without reference to any IPv6 address for the IPv4-only target SIP client device), 1215, and then transmits the configured SIP message as an IPv4 packet over an IPv4 socket to the dual stack SIP proxy/server for transmission to the source SIP client device. In this case, the source SIP client device is expected to recognize that the target SIP client device is IPv4-only based on the SIP message being sent to the source SIP client device over the IPv4 socket and/or based on the Via header including reference only to the IPv4 address without any reference to an IPv6 address.

Further, if the target SIP client device determines itself to be IPv6-only in 1210, then the IPv6-only target SIP client device configures a Via header of a SIP message (e.g., a SIP OPTIONS message) to include the IPv6 address of the IPv6-only target SIP client device, 1225, and then transmits the configured SIP message as an IPv6 packet over an IPv6 socket to the dual stack SIP proxy/server for transmission to the source SIP client device. In this case, the source SIP client device is expected to recognize that the target SIP client device is IPv6-only based on the SIP message being sent to the source SIP client device in an IPv6 packet that includes a Via header with an IPv6 address of the target SIP client device without an associated IPv4 address for the target SIP client device.

Further, if the target SIP client device determines itself to be dual stack in 1210, then the process advances to 1100 of FIG. 11. In other words, the target SIP client device configures a Via header of a SIP message (e.g., a SIP OPTIONS message) to include the IPv4 address of the target SIP client device (1100) and then transmits the configured SIP message as an IPv6 packet over an IPv6 socket to the dual stack SIP proxy/server for transmission to the source SIP client device (1110). In this case, the source SIP client device is expected to recognize that the target SIP client device is dual stack based on the SIP message being sent to the source SIP client device in an IPv6 packet that includes both the IPv4 address for the target SIP client device in a given Via header (along with an associated IPv6 address, which can be inserted at the network-side).

Figure 13:
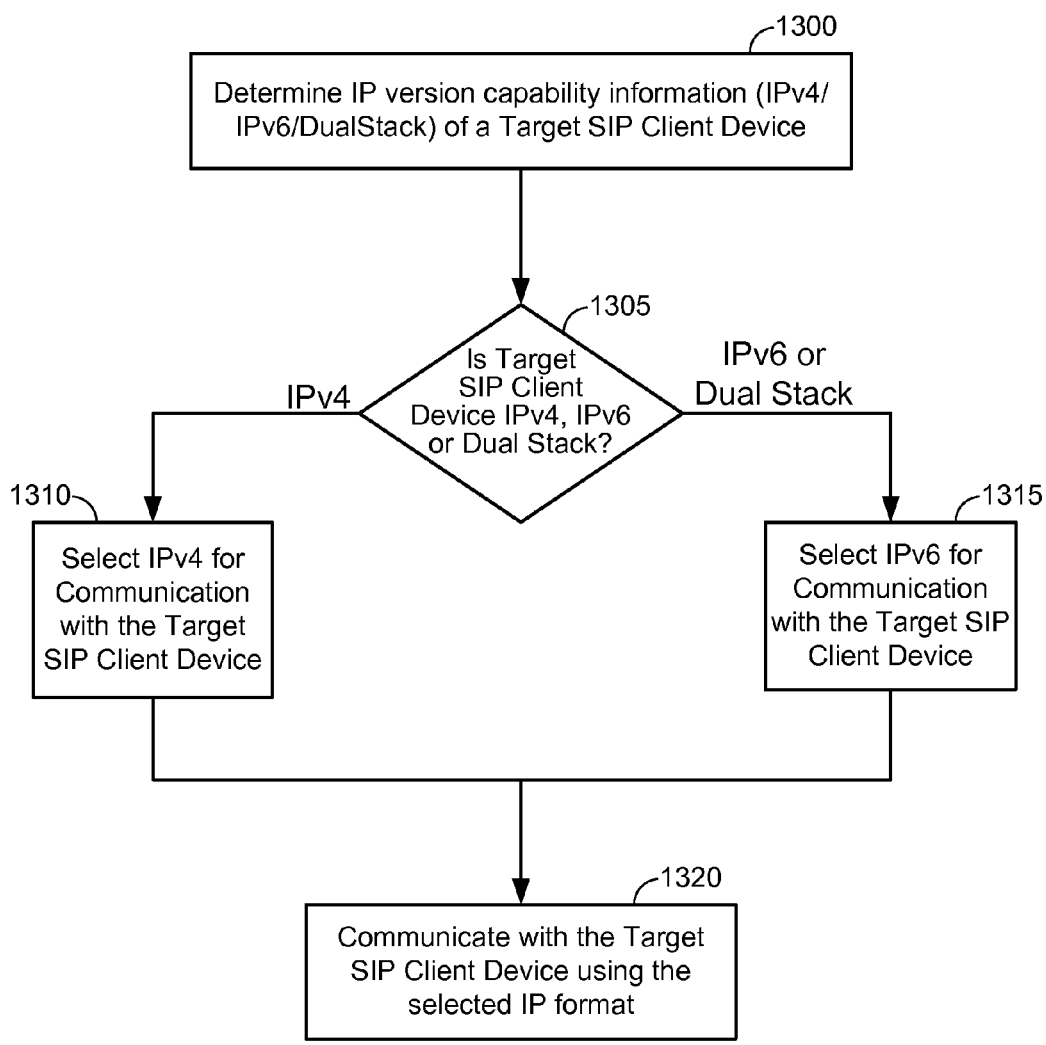
FIG. 13 illustrates operation of a source dual stack SIP client device in accordance with an embodiment of the invention.

FIG. 13 illustrates operation of a source dual stack SIP client device in accordance with an embodiment of the invention. Referring to FIG. 13, the source dual stack SIP client device determines IP version capability information (e.g., IPv4-only, IPv6-only or dual stack) of a target SIP client device, 1300. For example, the determination of 1300 can correspond to receipt of a SIP message that is sufficient to convey the IP version capability information for the target SIP client device as described above with respect to FIGS. 11-12. At some point after the determination of 1300, the target SIP client device initiates communication with the target SIP client device based on the determined IP version capability information, 1305.

In particular, if the source dual stack SIP client device determines that the target SIP client device is IPv4-only, then the source dual stack SIP client device selects IPv4 as an IP format for communication with the target SIP client device, 1310. Otherwise, if the source dual stack SIP client device is IPv6 or dual stack, then the source dual stack SIP client device selects IPv6 as the IP format for communication with the target SIP client device, 1315. The source dual stack SIP client device then initiates communication with the target SIP client device using the selected IP format, 1320.

The embodiments described above with respect to FIGS. 11-13 are described below in more detail with respect to different operating scenarios. In particular, FIG. 14 illustrates an example implementation of FIGS. 11-13 whereby a dual stack SIP client device is communicating with an IPv4-only SIP client device in accordance with an embodiment of the invention, FIG. 15 illustrates an example implementation of FIGS. 11-13 whereby a dual stack SIP client device is communicating with an IPv6-only SIP client device in accordance with an embodiment of the invention and FIG. 16 illustrates an example implementation of FIGS. 11-13 whereby a dual stack SIP client device is communicating with another dual stack SIP client device in accordance with an embodiment of the invention.

Figure 14:
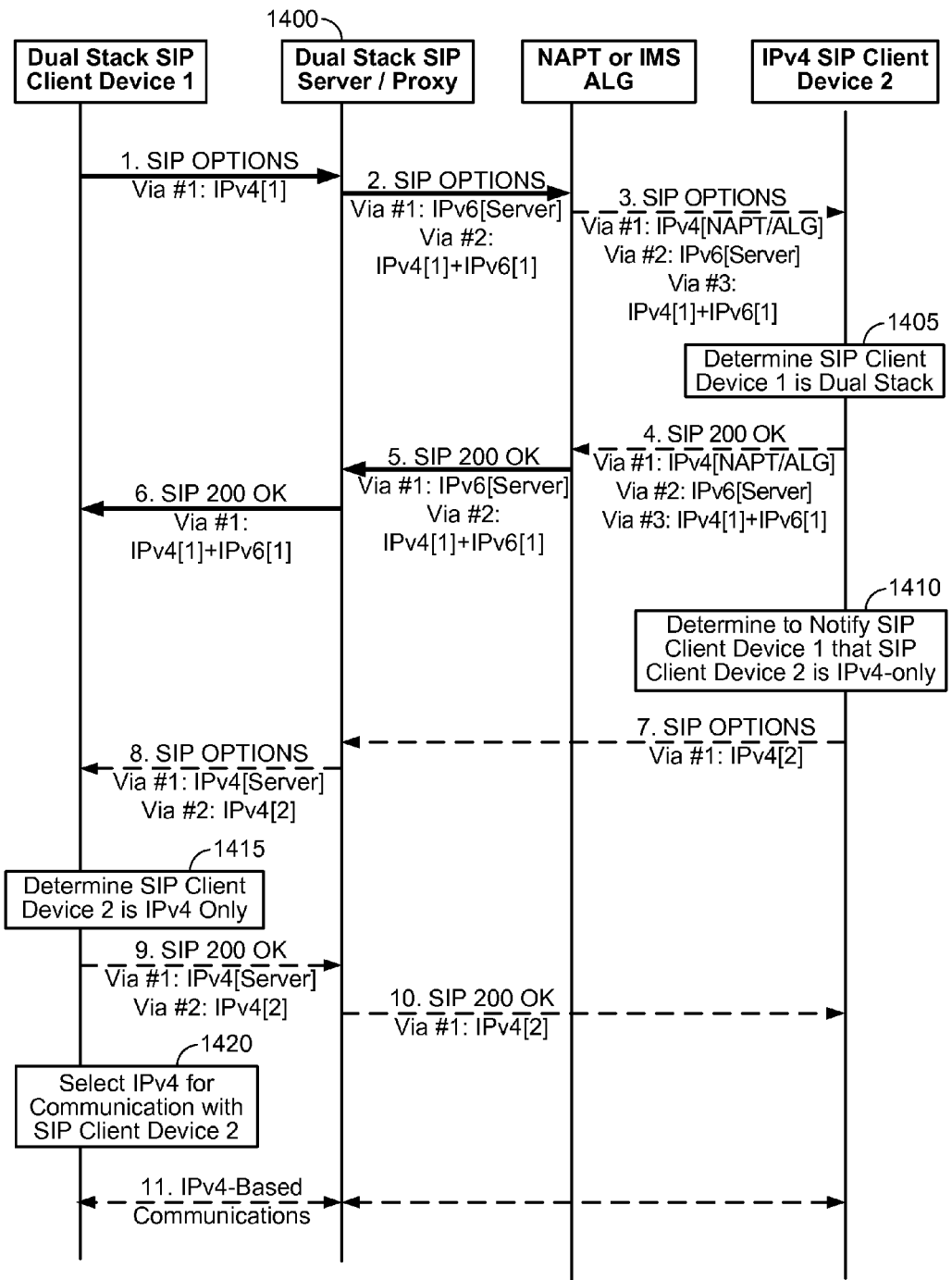
FIG. 14 illustrates an example implementation of FIGS. 11-13 whereby a dual stack SIP client device is communicating with an IPv4-only SIP client device in accordance with an embodiment of the invention.
Figure 15:
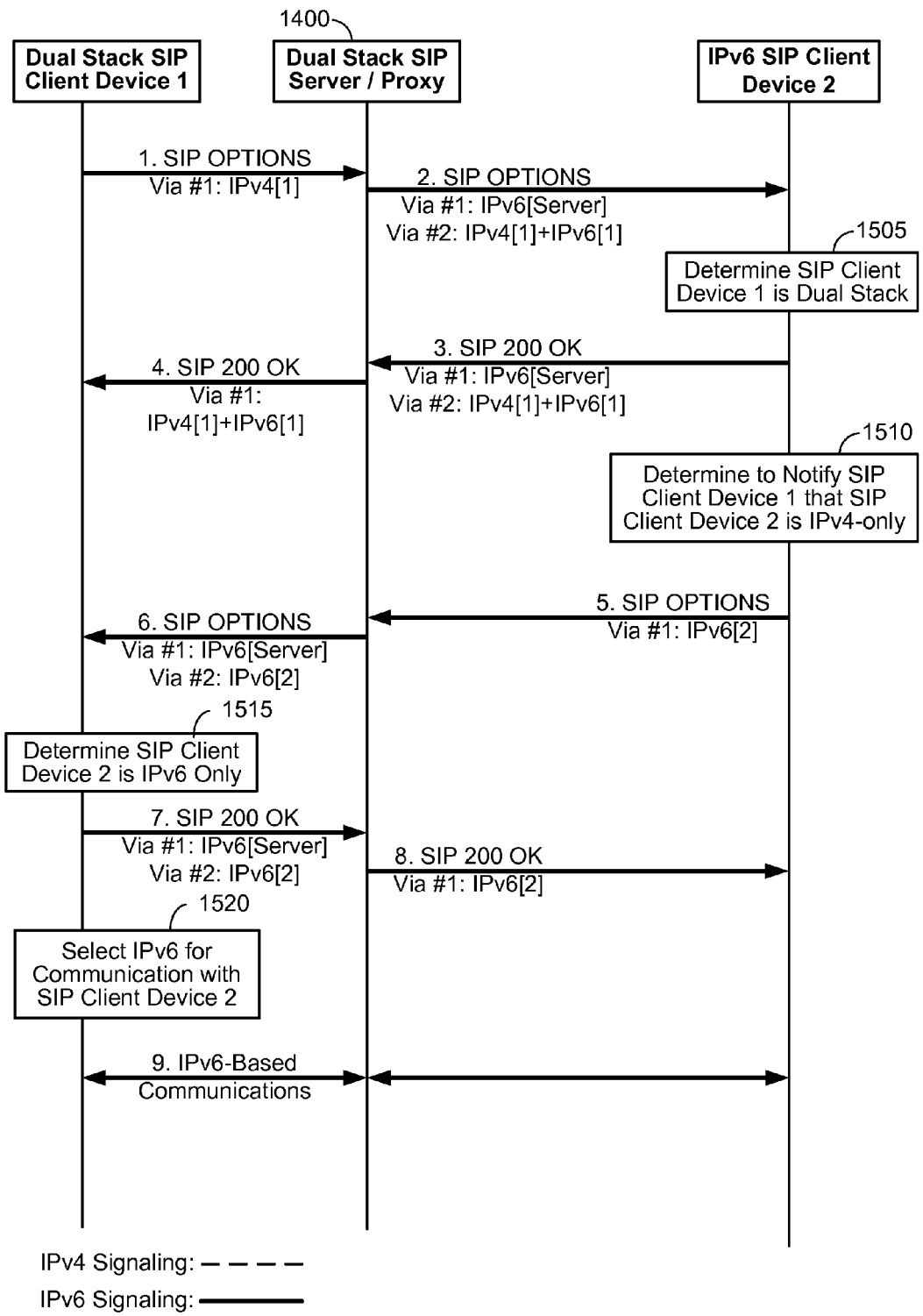
FIG. 15 illustrates an example implementation of FIGS. 11-13 whereby a dual stack SIP client device is communicating with an IPv6-only SIP client device in accordance with an embodiment of the invention.
Figure 16:
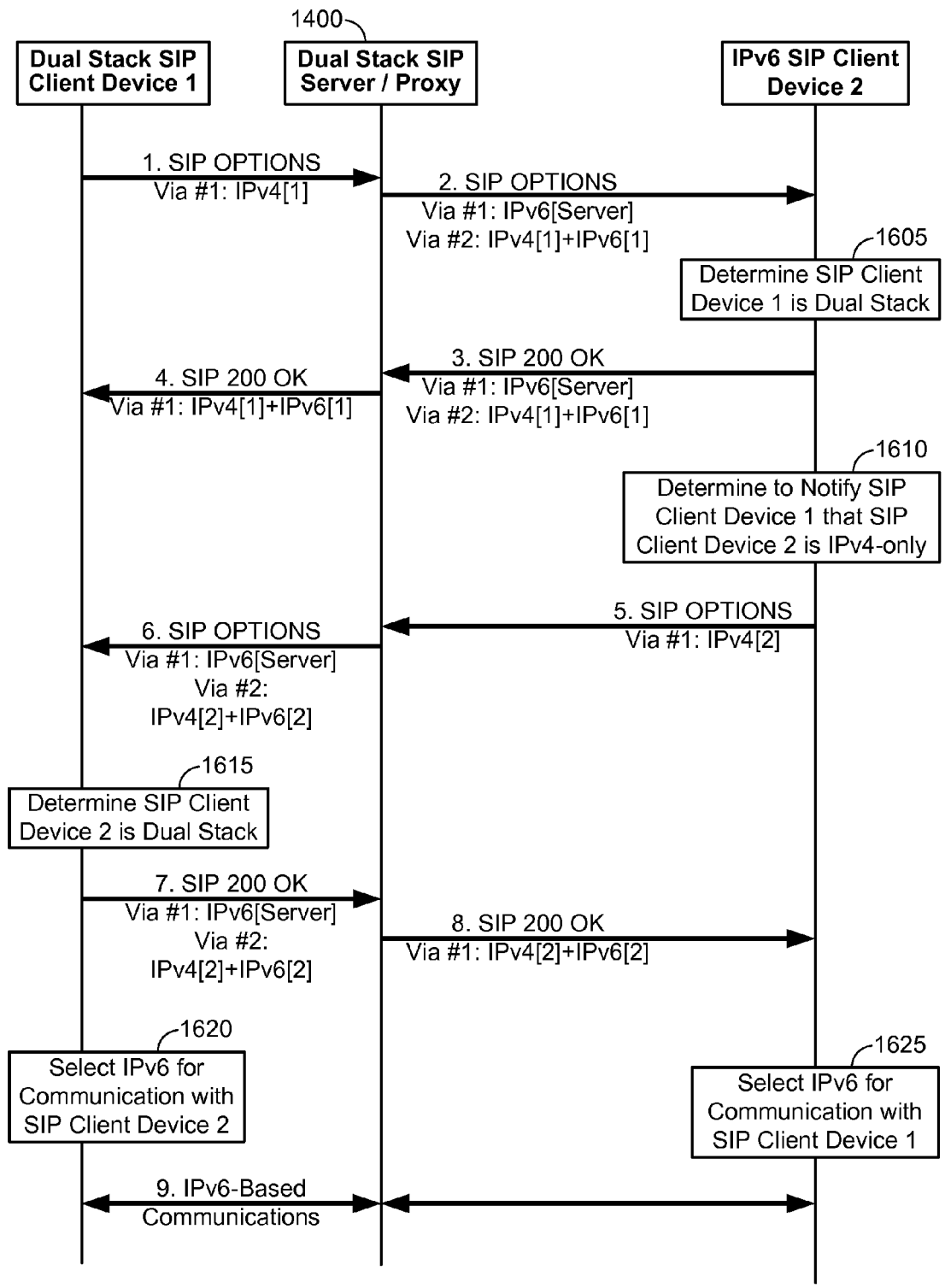
FIG. 16 illustrates an example implementation of FIGS. 11-13 whereby a dual stack SIP client device is communicating with another dual stack SIP client device in accordance with an embodiment of the invention.

In the embodiments of FIGS. 14-16, the following assumptions may be made, where applicable:

TABLE 2

Address Assumptions for FIGS. 14-16

|  | Dual Stack SIP Client Device 1 | Dual Stack SIP Server/ Proxy | SIP Client Device 2 (IPv4-only, IPv6-only or dual stack) |
|---|---|---|---|
| SIP URI | userA@example.com | N/A | userB@example.com |

TABLE 2-continued

Address Assumptions for FIGS. 14-16

|  | Dual Stack SIP Client Device 1 | Dual Stack SIP Server/ Proxy | SIP Client Device 2 (IPv4-only, IPv6-only or dual stack) |
|---|---|---|---|
| IPv4 | 192.0.2.1 or IPv4[1] | 192.10.10.10 or IPv4[Server] | 192.0.2.22 or IPv4[2] (if applicable) |
| IPv6 | 2001:DB8:CAFE:1::100 or IPv6[1] | 2001:DB8:CAFE:ABC::10 or IPv6[Server] | 2001:DB8:EFAC:123::100 or IPv6[2] (if applicable) |

Referring to FIG. 14, at (1), dual stack SIP client device 1 transmits a SIP OPTIONS message for delivery to a target SIP client device 2 configured to include a Via header set to "Via: SIP/2.0/UDP 192.0.2.1:5060" over an IPv6 socket to a dual stack SIP server/proxy 1400, similar to 1110 of FIG. 11. At this point in the embodiment of FIG. 15, the target SIP client device 2 is IPv4-only, but the dual stack SIP client device 1 is not yet aware of this. In FIG. 14, the dual stack SIP server/proxy 1400 is a SIP server/proxy that is addressable by both an IPv4 address and an IPv6 address, as noted above in Table 2. The dual stack SIP server/proxy 1400 receives the SIP OPTIONS message from (1) and implements standard SIP proxy behavior such as matching the IP address information in the Via header to the underlying IP header. In this case the dual stack SIP server/proxy 1400 detects that the Via header contains an IPv4 address, but the SIP request was received over an IPv6 socket, so the SIP proxy/server 1400 inserts a received parameter in the Via header containing the IPv6 address for dual stack SIP client device 1. As will be appreciated, this operation of the SIP proxy/server 1400 complies with standard SIP proxy behavior, except that the result is a SIP OPTIONS message that includes both IPv4 and IPv6 addresses for dual stack SIP client device 1. At (2), the dual stack SIP server/proxy 1400 sends the configured SIP OPTIONS message over an IPv6 socket with a first Via header of "Via: SIP/2.0/UDP [2001: DB8:CAFE:ABC::10]:5060" and a second Via header of "Via: SIP/2.0/UDP 192.0.2.1:5060;received=[2001:DB8: CAFE:1::100]" to either the NAPT gateway 700 or the IMS ALG 900 depending on the implementation.

Referring to FIG. 14, at (3), the NAPT or IMS ALG translates the IPv6-based SIP OPTIONS message into IPv4 and then transmits the IPv4-based SIP OPTIONS message to the IPv4 SIP client device 2 over an IPv4 socket with a first Via header of "Via: SIP/2.0/UDP <NATPTIPv4 address>", a second Via header of "Via: SIP/2.0/UDP [2001:DB8: CAFE:ABC::10]:5060" and a third Via header of "Via: SIP/2.0/UDP 192.0.2.1:5060; received=[2001:DB8:CAFE: 1::100]", similar to 1200 of FIG. 12. At 1405, the IPv4 SIP client device 2 identifies SIP client device 1 as dual stack based on the third Via header including both IPv4 and IPv6 addresses for the dual stack SIP client device 1, similar to 1205 of FIG. 12. At (4), the IPv4 SIP client device 2 responds to the SIP OPTIONS message from (3) by transmitting a SIP 200 OK message over an IPv4 socket having a first Via header of "Via: SIP/2.0/UDP <NATPTIPv4 address>", a second Via header of "Via: SIP/2.0/UDP [2001: DB8:CAFE:ABC::10]:5060" and a third Via header of "Via: SIP/2.0/UDP 192.0.2.1:5060;received=[2001:DB8:CAFE: 1::100]". At (5), the NAPT or IMS ALG translates the IPv4-based SIP 200 OK message into IPv6 and forwards the IPv6-based SIP 200 OK message over an IPv6 socket to the dual stack SIP server/proxy 1400 with a first Via header of "Via: SIP/2.0/UDP [2001:DB8:CAFE:ABC::10]:5060" and a second Via header of "Via: SIP/2.0/UDP 192.0.2.1:5060; received=[2001:DB8:CAFE:1::100]". At (6), the dual stack SIP server/proxy 1400 transmits the SIP 200 OK message over an IPv6 socket to the dual stack SIP client device with a Via header of "Via: SIP/2.0/UDP 192.0.2.1:5060;received=[2001:DB8:CAFE:1::100]".

Referring to FIG. 14, in addition to responding to the SIP OPTIONS message from (3) with a SIP 200 OK message as shown in (4)-(6), IPv4 SIP client device 2 also determines to notify dual stack SIP client device 1 that IPv4 SIP client device 2 is IPv4-only, 1410. To this end, at (7), IPv4 SIP client device 2 transmits a SIP OPTIONS message over an IPv4 socket configured with a Via header of "Via: SIP/2.0/ UDP 192.0.2.22:5060" to the dual stack SIP server/proxy 1400, similar to 1215-1220 of FIG. 12. Then, at (8), the dual stack SIP server/proxy 1400 transmits the SIP OPTIONS message to dual stack SIP client device 1 over an IPv4 socket with a first Via header of "Via: SIP/2.0/UDP 192.10.10.10" and a second Via header of "Via: SIP/2.0/ UDP 192.0.2.22:5060". At this point, dual stack SIP client device 1 recognizes that SIP client device 2 is IPv4-only based on SIP client device 2 using the IPv4 address of dual stack SIP client device 1 for communication instead of the IPv6 address of dual stack SIP client device 1, 1415. At (9), dual stack SIP client device 1 responds to the SIP OPTIONS message from (8) by transmitting a SIP 200 OK message over an IPv4 socket configured with a first Via header of "Via: SIP/2.0/UDP 192.10.10.10" and a second Via header of "Via: SIP/2.0/UDP 192.0.2.22:5060" to the dual stack SIP server/proxy 1400. Then, at (10), the dual stack SIP server/ proxy 1400 transmits the SIP 200 OK message to IPv4 SIP client device 2 over an IPv4 socket with a Via header of "Via: SIP/2.0/UDP 192.0.2.22:5060".

Referring to FIG. 14, after (10), dual stack SIP client device 1 will select IPv4 for any subsequent communication initiated with IPv4 SIP client device 2, 1420, similar to 1300-1310 of FIG. 13. At (11), an example of IPv4 communication initiated based on the selection of 1420 is shown, similar to 1320 of FIG. 13.

Turning to FIG. 15, at (1), dual stack SIP client device 1 transmits a SIP OPTIONS message for delivery to a target SIP client device 2 configured to include a Via header set to "Via: SIP/2.0/UDP 192.0.2.1:5060" over an IPv6 socket to the dual stack SIP server/proxy 1400, similar to 1110 of FIG. 11. At this point in the embodiment of FIG. 15, the target SIP client device 2 is IPv6-only, but the dual stack SIP client device 1 is not yet aware of this. The dual stack SIP server/proxy 1400 receives the SIP OPTIONS message from (1) and implements standard SIP proxy behavior such as matching the IP address information in the Via header to the underlying IP header. In this case the dual stack SIP server/ proxy 1400 detects that the Via header contains an IPv4 address, but the SIP request was received over an IPv6 socket, so the SIP proxy/server 1400 inserts a received parameter in the Via header containing the IPv6 address for dual stack SIP client device 1. As will be appreciated, this operation of the SIP proxy/server 1400 complies with standard SIP proxy behavior, except that the result is a SIP OPTIONS message that includes both IPv4 and IPv6 addresses for dual stack SIP client device 1. At (2), the dual stack SIP server/proxy 1400 sends the configured SIP OPTIONS message over an IPv6 socket with a first Via header of "Via: SIP/2.0/UDP [2001:DB8:CAFE:ABC::10]: 5060" and a second Via header of "Via: SIP/2.0/UDP 192.0.2.1:5060;received=[2001:DB8:CAFE:1::100]" to IPv6 SIP client device 2, similar to 1200 of FIG. 12. Unlike (2)-(3) of FIG. 14, the SIP OPTIONS message of (2) in FIG. 15 is delivered to IPv6 SIP client device 2 without IPv4/IPv6 translation because IPv6 SIP client device 2 is IPv6-capable.

Referring to FIG. 15, at 1505, the IPv6 SIP client device 2 identifies SIP client device 1 as dual stack based on the second Via header including both IPv4 and IPv6 addresses for the dual stack SIP client device 1, similar to 1205 of FIG. 12. At (3), the IPv6 SIP client device 2 responds to the SIP OPTIONS message from (2) by transmitting a SIP 200 OK message over an IPv6 socket to the dual stack SIP server/proxy 1400 having a first Via header of "Via: SIP/2.0/UDP [2001:DB8:CAFE:ABC::10]:5060" and a second Via header of "Via: SIP/2.0/UDP 192.0.2.1:5060;received=[2001:DB8: CAFE:1::100]". At (6), the dual stack SIP server/proxy 1400 transmits the SIP 200 OK message over an IPv6 socket to the dual stack SIP client device with a Via header of "Via: SIP/2.0/UDP 192.0.2.1:5060;received=[2001:DB8:CAFE: 1::100]".

Referring to FIG. 15, in addition to responding to the SIP OPTIONS message from (2) with a SIP 200 OK message as shown in (3)-(4), IPv6 SIP client device 2 also determines to notify dual stack SIP client device 1 that IPv6 SIP client device 2 is IPv6-only, 1510. To this end, at (5), IPv6 SIP client device 2 transmits a SIP OPTIONS message over an IPv6 socket configured with a Via header of "Via: SIP/2.0/ UDP[2001:DB8:EFAC:123::100]:5060" to the dual stack SIP server/proxy 1400, similar to 1225-1230 of FIG. 12. Then, at (6), the dual stack SIP server/proxy 1400 transmits the SIP OPTIONS message to dual stack SIP client device 1 over an IPv6 socket with a first Via header of "Via: SIP/2.0/UDP [2001:DB8:CAFE:ABC::10]:5060" and a second Via header of "Via: SIP/2.0/UDP[2001:DB8:EFAC: 123::100]:5060". At this point, dual stack SIP client device 1 recognizes that SIP client device 2 is IPv6-only based on the SIP OPTIONS message from (6) attaching the IPv6 address of dual stack SIP client device 1 without any reference to an IPv4 address in the IPv6-based SIP OPTIONS message from dual stack SIP client device 1, 1515. At (7), dual stack SIP client device 1 responds to the SIP OPTIONS message from (6) by transmitting a SIP 200 OK message over an IPv6 socket configured with a first Via header of "Via: SIP/2.0/UDP [2001:DB8:CAFE:ABC::10]: 5060" and a second Via header of "Via: SIP/2.0/UDP[2001: DB8:EFAC:123::100]:5060". Then, at (8), the dual stack SIP server/proxy 1400 transmits the SIP 200 OK message to IPv6 SIP client device 2 over an IPv6 socket with a Via header of "Via: SIP/2.0/UDP[2001:DB8:EFAC:123::100]: 5060".

Referring to FIG. 15, after (8), dual stack SIP client device 1 will select IPv6 for any subsequent communication initiated with IPv6 SIP client device 2, 1520, similar to 1300-1305 and 1315 of FIG. 13. At (9), an example of IPv6 communication initiated based on the selection of 1520 is shown, similar to 1320 of FIG. 13.

Turning to FIG. 16, at (1), dual stack SIP client device 1 transmits a SIP OPTIONS message for delivery to a target SIP client device 2 configured to include a Via header set to "Via: SIP/2.0/UDP 192.0.2.1:5060" over an IPv6 socket to a dual stack SIP server/proxy 1400, similar to 1110 of FIG. 11. At this point in the embodiment of FIG. 16, the target SIP client device 2 is dual stack, but the dual stack SIP client device 1 is not yet aware of this. In FIG. 16, the dual stack SIP server/proxy 1400 is a SIP server/proxy that is addressable by both an IPv4 address and an IPv6 address, as noted above in Table 2. The dual stack SIP server/proxy 1400 receives the SIP OPTIONS message from (1) and implements standard SIP proxy behavior such as matching the IP address information in the Via header to the underlying IP header. In this case the dual stack SIP server/proxy 1400 detects that the Via header contains an IPv4 address, but the SIP request was received over an IPv6 socket, so the SIP proxy/server 1400 inserts a received parameter in the Via header containing the IPv6 address for dual stack SIP client device 1. As will be appreciated, this operation of the SIP proxy/server 1400 complies with standard SIP proxy behavior, except that the result is a SIP OPTIONS message that includes both IPv4 and IPv6 addresses for dual stack SIP client device 1. At (2), the dual stack SIP server/proxy 1400 sends the configured SIP OPTIONS message over an IPv6 socket with a first Via header of "Via: SIP/2.0/UDP [2001: DB8:CAFE:ABC::10]:5060" and a second Via header of "Via: SIP/2.0/UDP 192.0.2.1:5060;received=[2001:DB8: CAFE:1::100]" to IPv6 SIP client device 2, similar to 1200 of FIG. 12. As will be appreciated, (1)-(2) of FIG. 16 are similar to (1)-(2) from FIG. 15. Unlike (2)-(3) of FIG. 14, the SIP OPTIONS message of (2) in FIG. 16 is delivered to dual stack SIP client device 2 without IPv4/IPv6 translation because dual stack SIP client device 2 is IPv6-capable.

Referring to FIG. 16, at 1605, the IPv6 SIP client device 2 identifies SIP client device 1 as dual stack based on the second Via header including both IPv4 and IPv6 addresses for the dual stack SIP client device 1, similar to 1205 of FIG. 12. At (3), the IPv6 SIP client device 2 responds to the SIP OPTIONS message from (2) by transmitting a SIP 200 OK message over an IPv6 socket to the dual stack SIP server/ proxy 1400 having a first Via header of "Via: SIP/2.0/UDP [2001:DB8:CAFE:ABC::10]:5060" and a second Via header of "Via: SIP/2.0/UDP 192.0.2.1:5060;received=[2001:DB8: CAFE:1::100]". At (6), the dual stack SIP server/proxy 1400 transmits the SIP 200 OK message over an IPv6 socket to the dual stack SIP client device with a Via header of "Via: SIP/2.0/UDP 192.0.2.1:5060;received=[2001:DB8:CAFE: 1::100]".

Referring to FIG. 16, in addition to responding to the SIP OPTIONS message from (2) with a SIP 200 OK message as shown in (3)-(4), dual stack SIP client device 2 also determines to notify dual stack SIP client device 1 that dual stack SIP client device 2 is dual stack, 1610. To this end, at (5), dual stack SIP client device 2 transmits a SIP OPTIONS message over an IPv6 socket configured with a Via header of "Via: SIP/2.0/UDP 192.0.2.22:5060" to the dual stack SIP server/proxy 1400, similar to 1100 and 1110 of FIG. 11. Then, at (6), the dual stack SIP server/proxy 1400 transmits the SIP OPTIONS message to dual stack SIP client device 1 over an IPv6 socket with a first Via header of "Via: SIP/2.0/UDP [2001:DB8:CAFE:ABC::10]:5060" and a second Via header of "Via: SIP/2.0/UDP 192.0.2.22:5060; received=[2001:DB8:EFAC:123::100]". At this point, dual stack SIP client device 1 recognizes that SIP client device 2 is dual stack based on the SIP OPTIONS message received at (6) attaching both IPv4 and IPv6 addresses of dual stack SIP client device 1, 1615. At (7), dual stack SIP client device 1 responds to the SIP OPTIONS message from (6) by transmitting a SIP 200 OK message over an IPv6 socket configured with a first Via header of "Via: SIP/2.0/UDP [2001:DB8:CAFE:ABC::10]:5060" and a second Via header of "Via: SIP/2.0/UDP 192.0.2.22:5060;received=[2001: DB8:EFAC:123::100]". Then, at (8), the dual stack SIP server/proxy 1400 transmits the SIP 200 OK message to dual stack SIP client device 2 over an IPv6 socket with a Via header of "Via: SIP/2.0/UDP 192.0.2.22:5060;received= [2001:DB8:EFAC:123::100]".

Referring to FIG. 16, after (8), both dual stack SIP client device 1 and dual stack SIP client device 2 will select IPv6 for any subsequent communication initiated with the other dual stack SIP client device, 1620 and 1625, similar to 1300-1305 and 1315 of FIG. 13. At (9), an example of IPv6 communication initiated based on the selection of 1620 or 1625 is shown, similar to 1320 of FIG. 13.

As will be appreciated, the exchange of SIP OPTIONS message shown above in FIGS. 14-16 can occur as part of a rich communication suite (RCS) capability discovery procedure that is modified to not only exchange RCS capability information, but also IP-version capability information.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a first client device, comprising:
receiving a SIP OPTIONS message from a server that originated from a second client device, the SIP OPTIONS message including a Via header with an IPv4 address of the second client device and an IPv6 address of the second client device in a same Via header field of the Via header; and
identifying the second client device as a dual stack client device that is capable of communication in accordance with IPv4 or IPv6 based on the SIP OPTIONS message including both the IPv4 and IPv6 addresses of the dual stack client device in the Via header.

2. The method of claim 1, wherein the first client device is an IPv4-only client device that is not capable of communication in accordance with IPv6.

3. The method of claim 2, wherein the SIP OPTIONS message is received on an IPv4 socket.

4. The method of claim 2, further comprising:
configuring a response to the SIP OPTIONS message to include a given Via header with a given IPv4 address of the first client device without any reference to any IPv6 address of the first client device; and
transmitting the configured response to the server via an IPv4 socket for transmission to the second client device,
wherein the configured response is configured to notify the second client device that the first client device is IPv4-only.

5. The method of claim 1, wherein the first client device is an IPv6-only client device that is not capable of communication in accordance with IPv4.

6. The method of claim 5, wherein the SIP OPTIONS message is received on an IPv6 socket.

7. The method of claim 5, further comprising:
configuring a response to the SIP OPTIONS message to include a given Via header with a given IPv6 address of the first client device without any reference to any IPv4 address of the first client device; and
transmitting the configured response to the server via an IPv6 socket for transmission to the second client device,
wherein the configured response is configured to notify the second client device that the first client device is IPv6-only.

8. The method of claim 1, wherein the first client device is another dual stack client device that is capable of communication in accordance with IPv4 or IPv6.

9. The method of claim 8, wherein the SIP OPTIONS message is received on an IPv6 socket.

10. The method of claim 8, further comprising:
configuring a response to the SIP OPTIONS message to include a given Via header with a given IPv4 address of the first client device; and
transmitting the configured response to the server via an IPv6 socket for transmission to the second client device,
wherein the configured response is configured to notify the second client device that the first client device is dual stack.

11. A first client device comprising a processor and memory, the processor and memory being configured to:
receive a SIP OPTIONS message from a server that originated from a second client device, the SIP OPTIONS message including a Via header with an IPv4 address of the second client device and an IPv6 address of the second client device in a same Via header field of the Via header; and
identify the second client device as a dual stack client device that is capable of communication in accordance with IPv4 or IPv6 based on the SIP OPTIONS message including both the IPv4 and IPv6 addresses of the dual stack client device in the Via header.

12. The first client device of claim 11, wherein the first client device is an IPv4-only client device that is not capable of communication in accordance with IPv6.

13. The first client device of claim 12, wherein the SIP OPTIONS message is received on an IPv4 socket.

14. The first client device of claim 12, wherein the processor and memory are further configured to:
configure a response to the SIP OPTIONS message to include a given Via header with a given IPv4 address of the first client device without any reference to any IPv6 address of the first client device; and
transmit the configured response to the server via an IPv4 socket for transmission to the second client device,
wherein the configured response is configured to notify the second client device that the first client device is IPv4-only.

15. The first client device of claim 11, wherein the first client device is an IPv6-only client device that is not capable of communication in accordance with IPv4.

16. The first client device of claim 15, wherein the SIP OPTIONS message is received on an IPv6 socket.

17. The first client device of claim 15, wherein the processor and memory are further configured to:
configure a response to the SIP OPTIONS message to include a given Via header with a given IPv6 address of the first client device without any reference to any IPv4 address of the first client device; and
transmit the configured response to the server via an IPv6 socket for transmission to the second client device,
wherein the configured response is configured to notify the second client device that the first client device is IPv6-only.

18. The first client device of claim 11, wherein the first client device is another dual stack client device that is capable of communication in accordance with IPv4 or IPv6.

19. The first client device of claim 18, wherein the SIP OPTIONS message is received on an IPv6 socket.

20. The first client device of claim 18, wherein the processor and memory are further configured to:
configure a response to the SIP OPTIONS message to include a given Via header with a given IPv4 address of the first client device; and
transmit the configured response to the server via an IPv6 socket for transmission to the second client device,
wherein the configured response is configured to notify the second client device that the first client device is dual stack.

21. A first client device, comprising:
means for receiving a SIP OPTIONS message from a server that originated from a second client device, the SIP OPTIONS message including a Via header with an IPv4 address of the second client device and an IPv6 address of the second client device in a same Via header field of the Via header; and
means for identifying the second client device as a dual stack client device that is capable of communication in accordance with IPv4 or IPv6 based on the SIP OPTIONS message including both the IPv4 and IPv6 addresses of the dual stack client device in the Via header.

22. The first client device of claim 21, wherein the first client device is an IPv4-only client device that is not capable of communication in accordance with IPv6.

23. The first client device of claim 22, further comprising:
means for configuring a response to the SIP OPTIONS message to include a given Via header with a given IPv4 address of the first client device without any reference to any IPv6 address of the first client device; and
means for transmitting the configured response to the server via an IPv4 socket for transmission to the second client device, wherein the configured response is configured to notify the second client device that the first client device is IPv4-only.

24. The first client device of claim 21, wherein the first client device is an IPv6-only client device that is not capable of communication in accordance with IPv4.

25. The first client device of claim 21, wherein the first client device is another dual stack client device that is capable of communication in accordance with IPv4 or IPv6.

26. A non-transitory computer-readable medium comprising at least one instruction for causing a processor to perform operations, comprising:
    code for receiving a SIP OPTIONS message from a server that originated from a second client device, the SIP OPTIONS message including a Via header with an IPv4 address of the second client device and an IPv6 address of the second client device in a same Via header field of the Via header; and
    code for identifying the second client device as a dual stack client device that is capable of communication in accordance with IPv4 or IPv6 based on the SIP OPTIONS message including both the IPv4 and IPv6 addresses of the dual stack client device in the Via header.

27. The non-transitory computer-readable medium of claim 26, wherein a first client device is an IPv4-only client device that is not capable of communication in accordance with IPv6.

28. The non-transitory computer-readable medium of claim 27, further comprising:
    code for configuring a response to the SIP OPTIONS message to include a given Via header with a given IPv4 address of the first client device without any reference to any IPv6 address of the first client device; and
    code for transmitting the configured response to the server via an IPv4 socket for transmission to the second client device,
    wherein the configured response is configured to notify the second client device that the first client device is IPv4-only.

29. The non-transitory computer-readable medium of claim 26, wherein a first client device is an IPv6-only client device that is not capable of communication in accordance with IPv4.

30. The non-transitory computer-readable medium of claim 26, wherein a first client device is another dual stack client device that is capable of communication in accordance with IPv4 or IPv6.

* * * * *